(12) United States Patent
Park et al.

(10) Patent No.: US 9,083,967 B2
(45) Date of Patent: Jul. 14, 2015

(54) METHOD FOR DISPLAYING A STEREOSCOPIC IMAGE AND DISPLAY APPARATUS FOR PERFORMING THE SAME

(75) Inventors: Bong-Im Park, Asan-si (KR); Jun-Pyo Lee, Asan-si (KR); Ik-Huyn Ahn, Asan-si (KR); Ho-Seok Son, Incheon (KR); Kang-Min Kim, Seoul (KR); Jung-Won Kim, Seoul (KR); Seon-Ki Kim, Anyang-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 613 days.

(21) Appl. No.: 13/228,578

(22) Filed: Sep. 9, 2011

(65) Prior Publication Data

US 2012/0127162 A1    May 24, 2012

(30) Foreign Application Priority Data

Nov. 19, 2010   (KR) .............................. 2010-0115539

(51) Int. Cl.
*H04N 13/04* (2006.01)
*H04N 13/00* (2006.01)

(52) U.S. Cl.
CPC ....... *H04N 13/0438* (2013.01); *H04N 13/0018* (2013.01); *H04N 13/0497* (2013.01)

(58) Field of Classification Search
USPC .......................................................... 348/51
See application file for complete search history.

(56) References Cited

U.S. PATENT DOCUMENTS

| 2002/0021261 | A1* | 2/2002 | Werner .............................. 345/8 |
| 2010/0007682 | A1* | 1/2010 | Kwon et al. .................. 345/690 |
| 2010/0066820 | A1* | 3/2010 | Park et al. ....................... 348/53 |
| 2011/0063332 | A1* | 3/2011 | Liao et al. ..................... 345/690 |
| 2011/0063424 | A1* | 3/2011 | Matsuhiro et al. .............. 348/58 |
| 2011/0069091 | A1* | 3/2011 | Kim et al. ..................... 345/690 |
| 2011/0193947 | A1* | 8/2011 | Chen ............................. 348/56 |

FOREIGN PATENT DOCUMENTS

| CN | 101409051 A | 4/2009 |
| CN | 101625842 A | 1/2010 |
| CN | 101827279 A | 9/2010 |
| JP | 2006317926 A | 11/2006 |
| KR | 1020060001425 A | 1/2006 |
| KR | 1020070019377 A | 2/2007 |
| KR | 1020070035373 A | 3/2007 |

* cited by examiner

*Primary Examiner* — Tracy Li
(74) *Attorney, Agent, or Firm* — Cantor Colburn LLP

(57) ABSTRACT

A method for displaying a stereoscopic image, the method comprises generating k images for a left eye and k images for a right eye based on a left-eye image and a right-eye image, where 'k' is a natural number greater than two, correcting an image currently received using an n-th image of the k images for the left eye and the k images for the right eye that are previously received, where 'n' is a natural number greater than 'k', displaying corrected k images for the left eye and corrected k images for the right eye on a display panel, and providing the display panel with lights based on the image displayed on the display panel.

20 Claims, 15 Drawing Sheets

FIG. 5

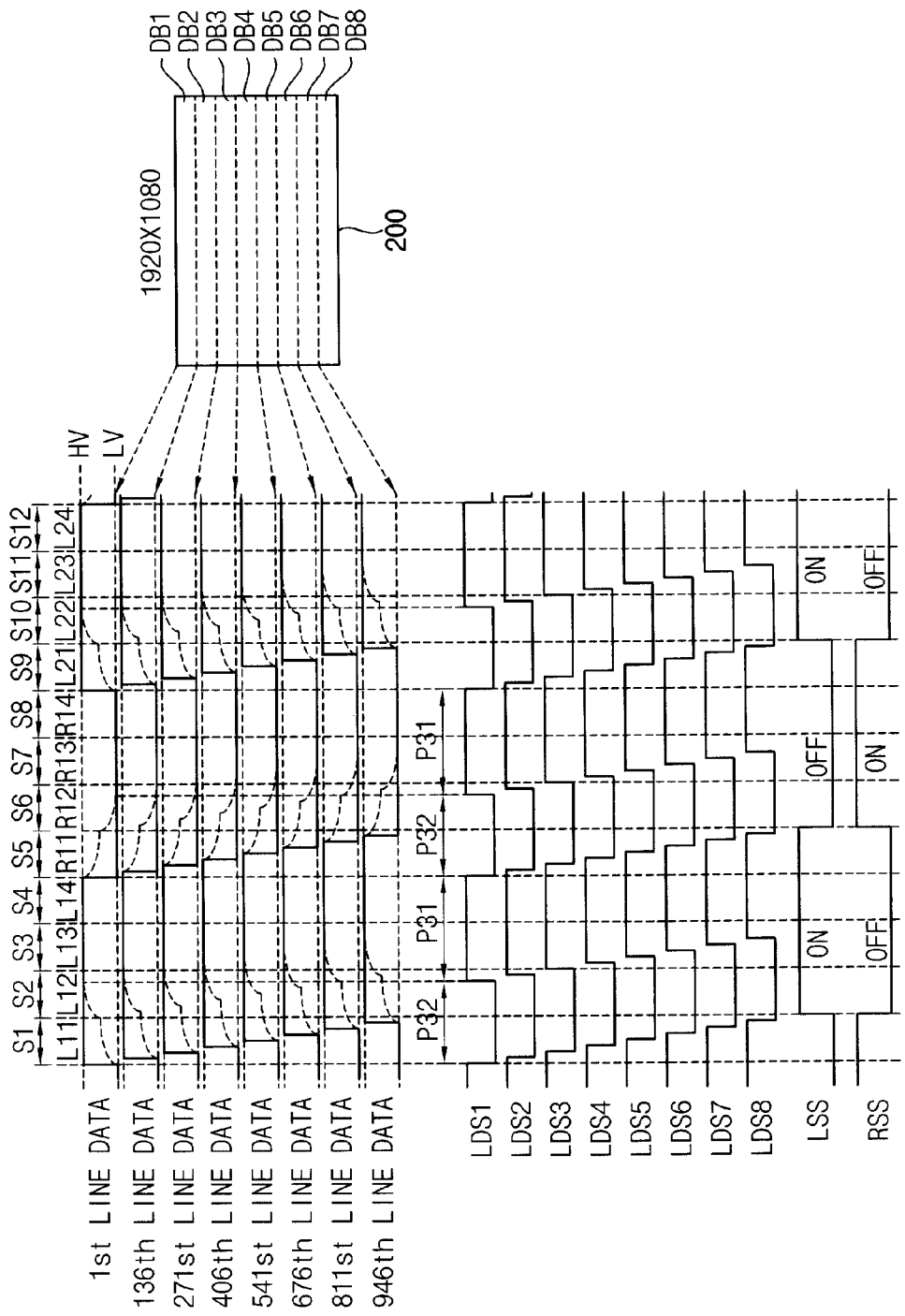

METHOD FOR DISPLAYING A STEREOSCOPIC IMAGE AND DISPLAY APPARATUS FOR PERFORMING THE SAME

This application claims priority to Korean Patent Application No. 10-2010-0115539, filed on Nov. 19, 2010, and all the benefits accruing therefrom under 35 U.S.C. §119, the content of which in its entirety is herein incorporated by reference.

BACKGROUND OF THE INVENTION

1. Field of the Invention

Exemplary embodiments of the invention relate to a method for displaying a stereoscopic image and a display apparatus for performing the method. More particularly, exemplary embodiments of the invention relate to a method for displaying a stereoscopic image capable of substantially enhancing a display quality and a display apparatus for performing the method.

2. Description of the Related Art

Generally, a display apparatus displays two-dimensional images (hereinafter also referred to as "2D" images). Recently, according to increasing demand for the display of three-dimensional images (hereinafter also referred to as "3D" images) in various fields such as games and movies, for example, display apparatuses for displaying 3D images have been developed.

A 3D image display apparatus typically displays a 3D image using binocular parallax, which is a process of directing two distinct images to the left and right eyes of an observer. By directing a left-eye image to a left eye of the observer and a right-eye image to a right eye of the observer, the observer is able to perceive a sense of depth.

The 3D image display apparatus using the binocular parallax may include a stereoscopic-type display apparatus and an auto-stereoscopic-type display apparatus according to whether specific glasses are necessary to properly view the 3D display device. Furthermore, the stereoscopic-type display apparatus may include various types of display apparatus such as a passive-polarized-glasses-type display apparatus and an active-shutter-glasses-type display apparatus, for example. In the passive-polarized-glasses-type display apparatus, a pair of glasses having substantially different polarizing axes is used by a user. In the active-shutter-glasses-type display apparatus, display of the left-eye image and the right-eye image are alternated, and a pair of glasses in which a left-eye shutter and a right-eye shutter are closed and opened in synchronization with the alternating display is used.

Since a liquid crystal display ("LCD") apparatus is driven by a progressive scan method, periods of applying line data into plural horizontal lines of the LCD apparatus are substantially different from each other, and liquid crystal response speeds for the same period are substantially different from each other. As such, when a left-eye image and a right-eye image are alternately displayed on a display panel of the LCD apparatus to display a stereoscopic image in accordance with driving characteristics of the LCD apparatus, a crosstalk is substantially greatly generated due to a gradation difference between the left-eye image and the right-eye image and an interval in which the left-eye image and the right-eye image are simultaneously displayed due to the progressive scan method. The crosstalk may substantially decrease a display quality of a stereoscopic image.

SUMMARY OF THE INVENTION

Exemplary embodiments of the invention provide a method of displaying a stereoscopic image capable of preventing a crosstalk of the stereoscopic image.

Exemplary embodiments of the invention also provide a display apparatus for performing the above-mentioned method.

According to one exemplary embodiment of the invention, there is provided a method for displaying a stereoscopic image. In the method, k images for a left eye and k images for a right eye is generated based on a left-eye image and a right-eye image, where 'k' is a natural number greater than two. An image currently received is corrected using an n-th image of the k images for a left eye and the k images for a right eye that are previously received, where 'n' is a natural number greater than 'k'. Corrected k images for the left eye and corrected k images for the right eye are displayed on a display panel. The display panel is provided with lights based on the image displayed on the display panel.

According to another exemplary embodiment of the invention, a display apparatus includes a frame control part, a data correcting part, a panel driving part and a light source part. The frame control part is configured to generate k images for a left eye and k images for a right eye based on a left-eye image and a right-eye image, where 'k' is a natural number greater than two. The data correcting part is configured to correct an image currently received using an n-th image of the k images for a left eye and the k images for a right eye that are previously received, where 'n' is a natural number greater than 'k'. The panel driving part is configured to display corrected k images for the left eye and corrected k images for the right eye on a display panel. The light source part is configured to provide the display panel with lights based on the image displayed on the display panel.

According to some exemplary embodiments of the invention, the left-eye image (or the right-eye image) is repeatedly corrected in k times, so that a display quality of a stereoscopic image may be substantially enhanced. Moreover, lights are not provided to the display panel during an interval in which the left-eye image and the right-eye image are combined to be displayed on the display panel, so that a crosstalk of a stereoscopic image may be prevented. Moreover, a black image is inserted between the left-eye image and the right-eye image, so that a time capable of correcting a slow falling response speed of liquid crystal may be secured. Thus, a duty ratio of a light source driving signal is altered, so that luminance efficiency may be substantially enhanced.

BRIEF DESCRIPTION OF THE DRAWINGS

The above and other features and advantages of the invention will become more apparent by describing in detailed exemplary embodiments thereof with reference to the accompanying drawings, in which:

FIG. 5 is a schematic diagram explaining an exemplary embodiment of a look up table of a correcting part of FIG. 4;

FIG. 11 is a schematic diagram explaining an exemplary embodiment of a driving method of a display apparatus of FIG. 9;

DETAILED DESCRIPTION OF THE INVENTION

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of the invention will be explained in detail with reference to the accompanying drawings.

Figure 1:
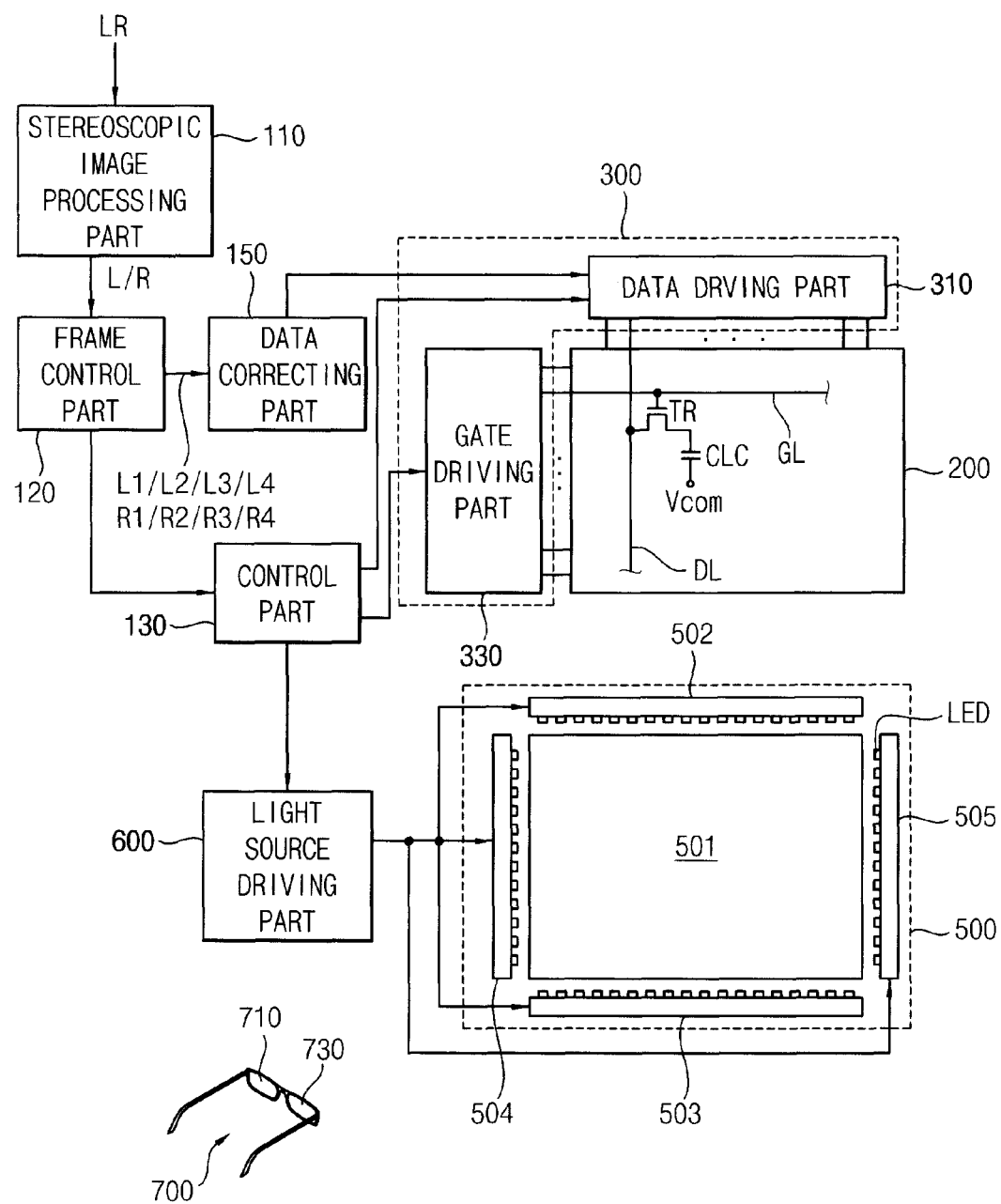
FIG. 1 is a block diagram illustrating an exemplary embodiment of a display apparatus.

FIG. 1 is a block diagram illustrating an exemplary embodiment of a display apparatus. FIGS. 2A to 2E are block diagrams in accordance with various exemplary embodiments of a light source part of FIG. 1.

Referring to FIG. 1, the display apparatus includes a stereoscopic image processing part 110, a frame control part 120, a control part 130, a data correcting part 150, a display panel 200, a panel driving part 300, a light source part 500, a light source driving part 600 and an eyeglasses part 700.

The stereoscopic image processing part 110 receives a compressed image LR, and generates a left-eye image L and a right-eye image R using the compressed image LR. In one embodiment, the stereoscopic image processing part 110 respectively generates a left-eye image L and a right-eye image R of about 120 Hertz (Hz) using the compressed image of about 60 Hz, for example. In this case, an image of about 60 Hz is an image for displaying one frame image in a frequency of about 60 Hz, and the image of about 120 Hz is an image for displaying one frame image in a frequency of about 120 Hz.

The frame control part 120 receives the left-eye image L and the right-eye image R. The frame control part 120 outputs k images for a left eye using the left-eye image L, and outputs k images for a right eye using the right-eye image R. In this case, 'k' is a natural number greater than 2.

In one embodiment, for example, the frame control part 120 generates a first left-eye image L1, a second left-eye image L2, a third left-eye image L3 and a fourth left-eye image L4 by repeatedly displaying four times the left-eye image L of about 120 Hz. Moreover, the frame control part 120 generates a first right-eye image R1, a second right-eye image R2, a third right-eye image R3 and a fourth right-eye image R4 by repeatedly displaying four times the right-eye image R of about 120 Hz. The first to fourth left-eye images L1, L2, L3 and L4 and the first to fourth right-eye images R1, R2, R3 and R4 are an image of about 480 Hz for displaying one frame image in a frequency of about 480 Hz. The left-eye image L and the right-eye image R are repeatedly displayed on the display panel 200 in k times, so that a display quality of a stereoscopic image may be substantially enhanced.

The control part 130 controls an operation of the data correcting part 150 based on a synchronization signal provided from the frame control part 120. Moreover, the control part 130 controls a driving timing of the display apparatus.

The data correcting part 150 corrects k images for the left eye and k images for the right eye that are provided from the frame control part 120 using a plurality of look up tables. The data correcting part 150 determines an n-th image of the k images as a reference data of a previous frame, and corrects the k images for the left eye of a current frame or the k images for the right eye of a current frame using the reference data. In this case, 'n' is a natural number smaller than k.

The display panel 200 includes a plurality of pixels displaying an image. In one embodiment, for example, each of the pixels includes a thin-film transistor ("TFT") TR connected to a gate line GL and a data line DL, and a liquid crystal capacitor CLC including a first terminal electrically connected to the TFT TR and a second terminal receiving a common voltage Vcom.

The panel driving part 300 includes a data driving part 310 and a gate driving part 330 to display k images for the left eye and k image for the right eye that are corrected by the data correcting part 150. The data driving part 310 converts the left-eye image and the right-eye image corrected by the data correcting part 150 into a data voltage, and provides the data line DL with the data voltage in accordance with a control of the control part 130. The gate driving part 330 generates a gate signal to provide the gate line GL with the gate signal in accordance with a control of the control part 130. In one exemplary embodiment, the panel driving part 300 displays a frame image on the display panel 200 in a progressive scan method.

The light source part 500 includes a light guide plate ("LGP") 501 and a plurality of light-emitting modules 502, 503, 504 and 505. Each of the light-emitting modules 502, 503, 504 and 505 includes a plurality of light-emitting diodes ("LEDs"). In one embodiment, for example, a first light-emitting module 502 is disposed at a first side of the LGP 501, and a second light-emitting module 503 is disposed at a second side of the LGP 501, which faces the first light-emitting module 502. A third light-emitting module 504 is disposed at a third side of the LGP 501, which is adjacent to the first light-emitting module 502, and a fourth light-emitting module 505 is disposed at a fourth side of the LGP 501, which faces the third light-emitting module 504.

Moreover, the exemplary embodiment of the display apparatus may include light source parts shown in FIGS. 2A to 2E.

Figure 2A:
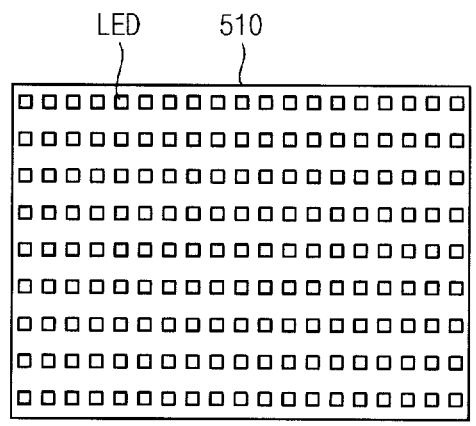
FIGS. 2A to 2E are block diagrams illustrating various exemplary embodiments of a light source part of FIG. 1.

A light source part 510 shown in FIG. 2A includes a plurality of light sources. In one exemplary embodiment, the light source may be an LED. The light source part 510 is disposed below the display panel 200. In the present exemplary embodiment, the light source is an LED, but in one alternative exemplary embodiment, the light source may be a fluorescent lamp.

Figure 2B:
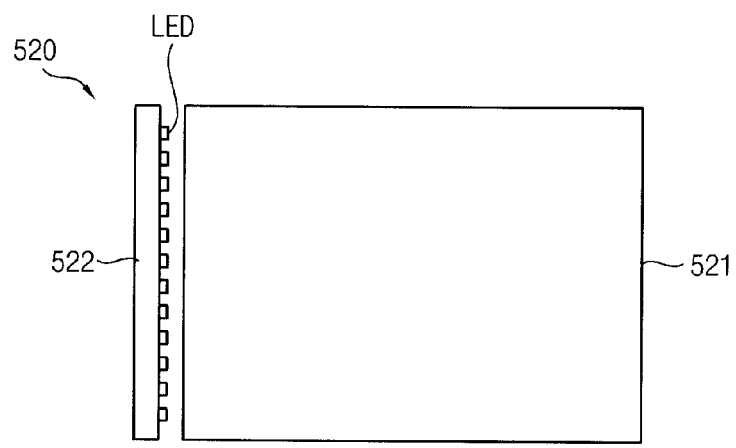

A light source part 520 shown in FIG. 2B includes an LGP 521 disposed below the display panel 200 and a light-emitting module 522 disposed at one of edges of a short side of the LGP 521. The light-emitting module 522 may include a light source. The light source includes an LED. In the present exemplary embodiment, the light-emitting module 522 including an LED is disposed at an edge of a short side of the LGP 521, but in one alternative exemplary embodiment, a fluorescent lamp instead of the light-emitting module 522 may be disposed at an edge of a short side of the LGP 521.

Figure 2C:
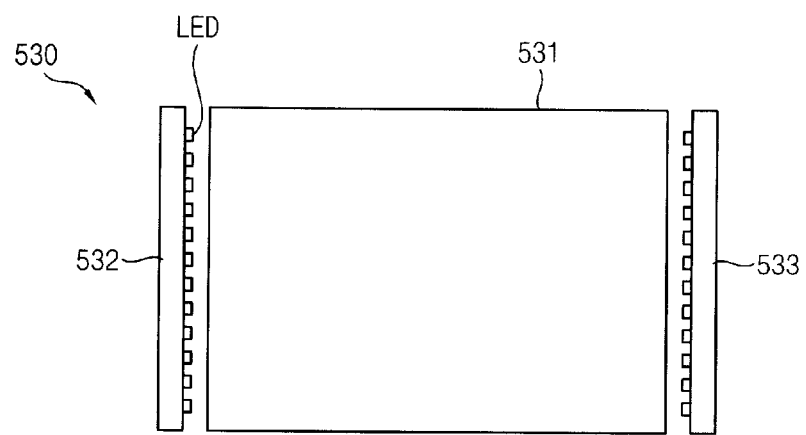

A light source part 530 of FIG. 2C includes a LGP 531 disposed below the display panel 200, a first light-emitting module 532 disposed at an edge of a first short side of the LGP 531 and a second light-emitting module 533 disposed at an edge of a second short side of the LGP 531. Each of the first and second light-emitting modules 532 and 533 includes a light source. The light source may include an LED. In the present exemplary embodiment, the first and second light-emitting modules 532 and 533 are disposed at two short sides of the LGP 531, but in one alternative exemplary embodiment, a fluorescent lamp instead of the first and second light-emitting modules 532 and 533 may be disposed at two short sides of the LGP 531.

Figure 2D:
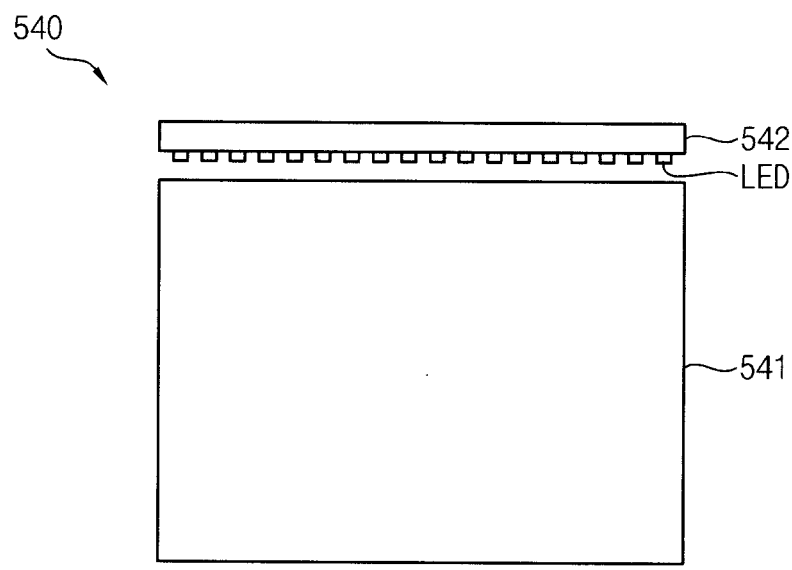

A light source part 540 of FIG. 2D includes an LGP 541 disposed below the display panel 200 and a light-emitting module 542 disposed at one of edges of a long side of the LGP 521. The light-emitting module 542 includes a light source. The light source may include an LED. In the present exemplary embodiment, the light-emitting module 542 including an LED is disposed at an edge of a long side of the LGP 541, but in one alternative exemplary embodiment, a fluorescent lamp instead of the light-emitting module 542 may be disposed at an edge of a long side of the LGP 541.

Figure 2E:
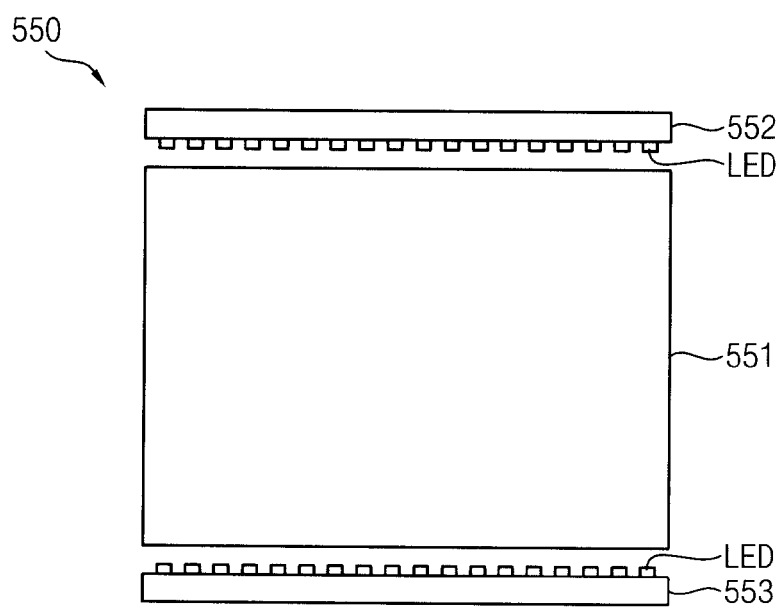

A light source part 550 of FIG. 2E includes an LGP 551 disposed below the display panel 200, a first light-emitting module 552 disposed at an edge of a first long side of the LGP 551 and a second light-emitting module 553 disposed at an edge of a second long side of the LGP 551. Each of the first and second light-emitting modules 552 and 553 includes a light source. The light source may include an LED. In the present exemplary embodiment, the first and second light-emitting modules 552 and 553 are disposed at two long sides of the LGP 551, but in one alternative exemplary embodiment, a fluorescent lamp instead of the first and second light-emitting modules 552 and 553 may be disposed at two long sides of the LGP 551.

Referring back to FIG. 1, the light source driving part 600 generates a light source driving signal which turns on or turns off the light source part 500 in accordance with a control of the control part 130. In one exemplary embodiment, for example, the light source driving part 600 turns on the light source part 500 to provide the display panel 200 with lights in an interval in which the left-eye image or the right-eye image is displayed on the display panel 200. The light source driving part 600 turns off the light source part 500 to unprovide the display panel with lights in which the left-eye image and the right-eye image are displayed on the display panel 200. Thus, the light source part 500 is turned off in an interval in which the left-eye image and the right-eye image are combined to be displayed on the display panel 200, so that a crosstalk between the left-eye image and the right-eye image is not viewed by a viewer.

The eyeglasses part 700 includes a left-eye shutter 710 and a right-eye shutter 730, and selectively opens and closes the left-eye shutter 710 and the right-eye shutter 730 in synchronization with an image displayed on the display panel 200. In one exemplary embodiment, the left-eye shutter 710 and the right-eye shutter 730 may be a liquid crystal shutter. In one exemplary embodiment, for one example, the eyeglasses part 700 opens the left-eye shutter 710 and closes the right-eye shutter 730 during an interval in which the left-eye image is displayed on the display panel 200. In one exemplary embodiment, the eyeglasses part 700 opens the right-eye shutter 730 and closes the left-eye shutter 710 during an interval in which the right-eye image is displayed on the display panel 200.

Figure 3:
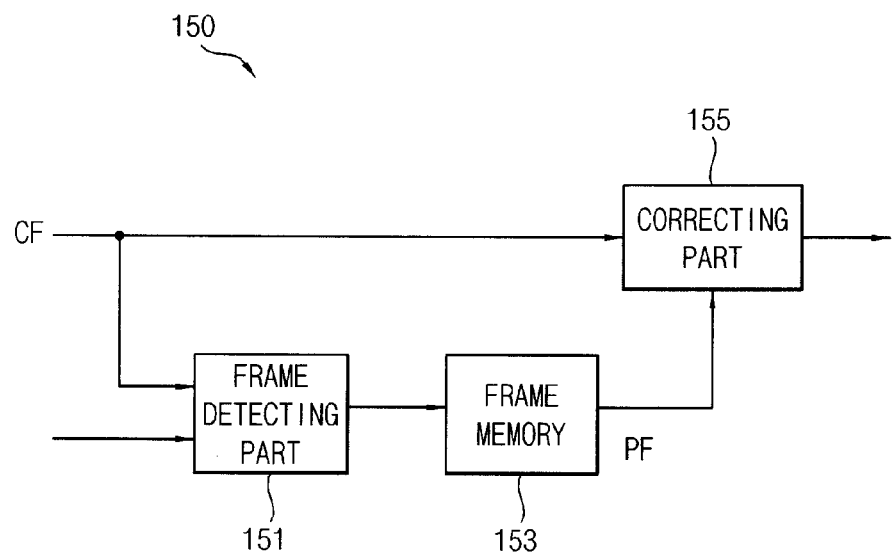
FIG. 3 is a block diagram illustrating an exemplary embodiment of a data correcting part of FIG. 1.
Figure 4:
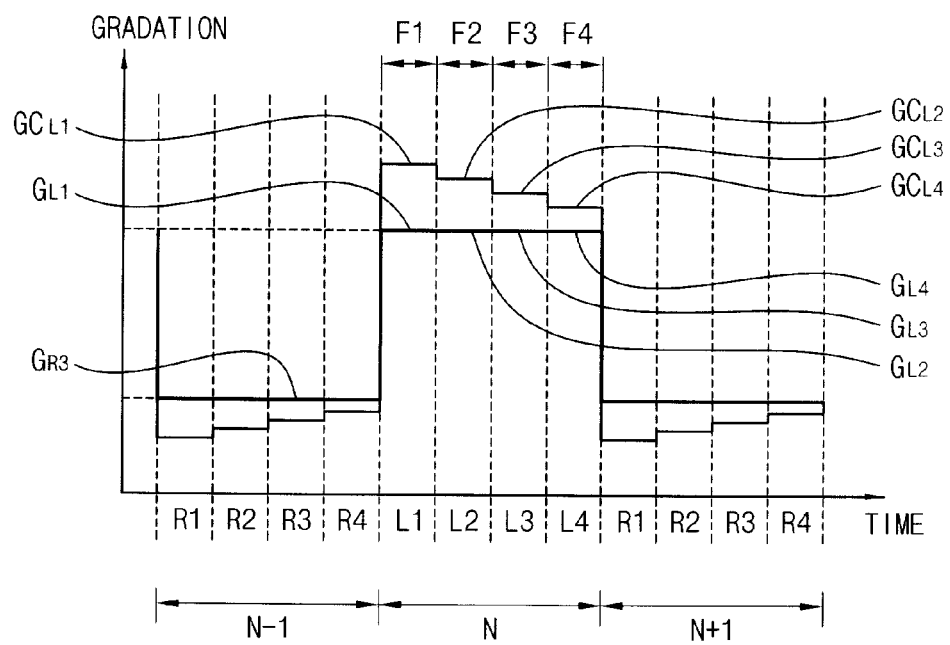
FIG. 4 is a schematic diagram explaining an exemplary embodiment of a driving method of a data correcting part of FIG. 3.
Figure 5:
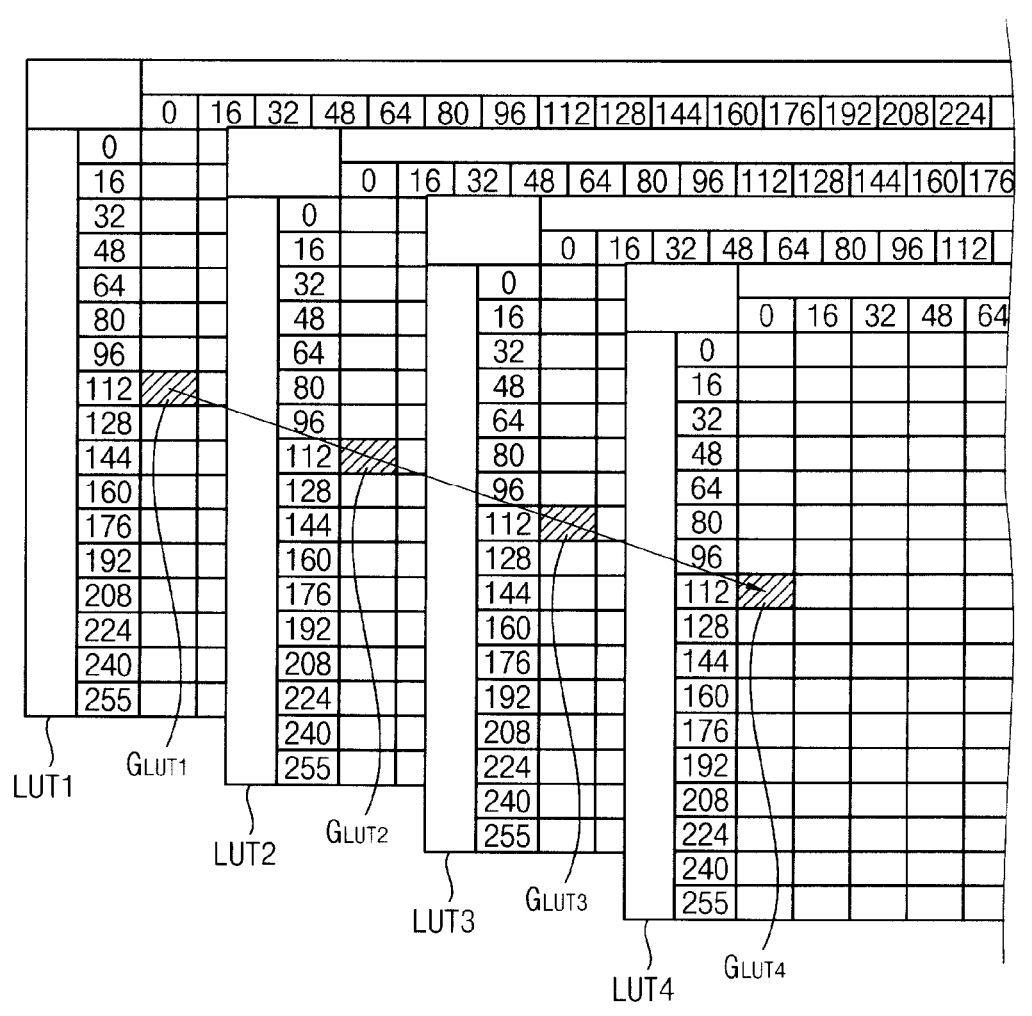

FIG. 3 is a block diagram illustrating an exemplary embodiment of a data correcting part 150 of FIG. 1. FIG. 4 is a schematic diagram explaining a driving method of the exemplary embodiment of a data correcting part 150 of FIG. 3. FIG. 5 is a schematic diagram explaining a look up table of the exemplary embodiment of the data correcting part 150 of FIG. 1.

Referring to FIGS. 1, 3, 4 and 5, the data correcting part 150 includes a frame detecting part 151, a frame memory 153 and a correcting part 155.

The frame detecting part 151 detects an n-th image of k images generated in the frame generating control part 120 in accordance with a control of the control part 130. In one embodiment, for example, the frame detecting part 151 detects the third left-eye image L3 that is a third image set in the first, second, third and fourth left-eye images L1, L2, L3 and L4. Moreover, the frame detecting part 151 detects a third right-eye image R3 of four images R1, R2, R3 and R4 for a right eye.

The frame memory 153 stores the n-th image detected in the frame detecting part 151. That is, the n-th image stored in the frame memory 153 is provided to the correcting part 155 as a reference data of a previous frame.

The correcting part 155 may include a plurality of look up tables (i.e., LUT1, LUT2, LUTk). The look up tables store correcting data mapped in accordance with a reference data of a previous frame PF and gradation data of a current frame CF. The correcting part 155 outputs correcting data of k images using the look up tables LUT1, LUT2, LUTk. The correcting part 155 may correct k images using k look up tables.

Hereinafter, a driving method of the data correcting part 150 will be described below.

In one exemplary embodiment, when a third image of four images is determined as a reference data of a previous frame, for example, it will be explained that the data correcting part 150 corrects each of first, second, third and fourth left-eye images received for an N-th interval N including first, second, third and fourth sub-frames F1, F2, F3 and F4. In the present exemplary embodiment, a period of the interval may be about 8 ms, and a period of a sub-frame may be about 2 ms, for example.

When a gradation data $G_{L1}$ of the first left-eye image L1 is received, the correcting part 155 uses a first look up table LUT1 to output a gradation data $G_{LUT1}$, which is mapped by a gradation data $G_{L1}$ of the first left-eye image L1 and a reference data of a previous frame stored in the frame memory 153, that is a gradation data $G_{R3}$ of the third right-eye image R3 received in an (N−1)-th interval, as a correcting data $GC_{L1}$ of the first left-eye image L1.

Then, when a gradation data $G_{L2}$ of the second left-eye image L2 is received, the correcting part 155 uses a second look up table LUT2 to output a gradation data $G_{LUT2}$, which is mapped by a gradation data $G_{L2}$ of the second left-eye image L2 and a gradation data $G_{R3}$ of the third right-eye image R3, as a correcting data $GC_{L2}$ of the second left-eye image L2.

Then, when a gradation data $G_{L3}$ of the third left-eye image L3 is received, the frame detecting part 151 determines a gradation data $G_{L3}$ of the third left-eye image L3 as a reference data of a previous frame, and stores the gradation data $G_{L3}$ of the third left-eye image L3 to the frame memory 153. The correcting part 155 uses a third look up table LUT3 to output a gradation data $G_{LUT3}$, which is mapped by a gradation data $G_{L3}$ of the third left-eye image L3 and a gradation data $G_{R3}$ of the third right-eye image R3, as a correcting data $GC_{L3}$ of the third left-eye image L3.

Then, when a gradation data $G_{L4}$ of the fourth left-eye image L4 is received, the correcting part 155 uses a fourth look up table LUT4 to output a gradation data $G_{LUT4}$, which is mapped by a gradation data $G_{L4}$ of the fourth left-eye image L4 and a gradation data $G_{R3}$ of the third right-eye image R3, as a correcting data $GC_{L4}$ of the fourth left-eye image L4.

Accordingly, a corrected data that is overdriven or a corrected data that is underdriven is repeatedly applied to liquid crystal for k times, so that a luminance level may be substantially enhanced. Therefore, a display quality of a stereoscopic image may be substantially enhanced.

Figure 6:
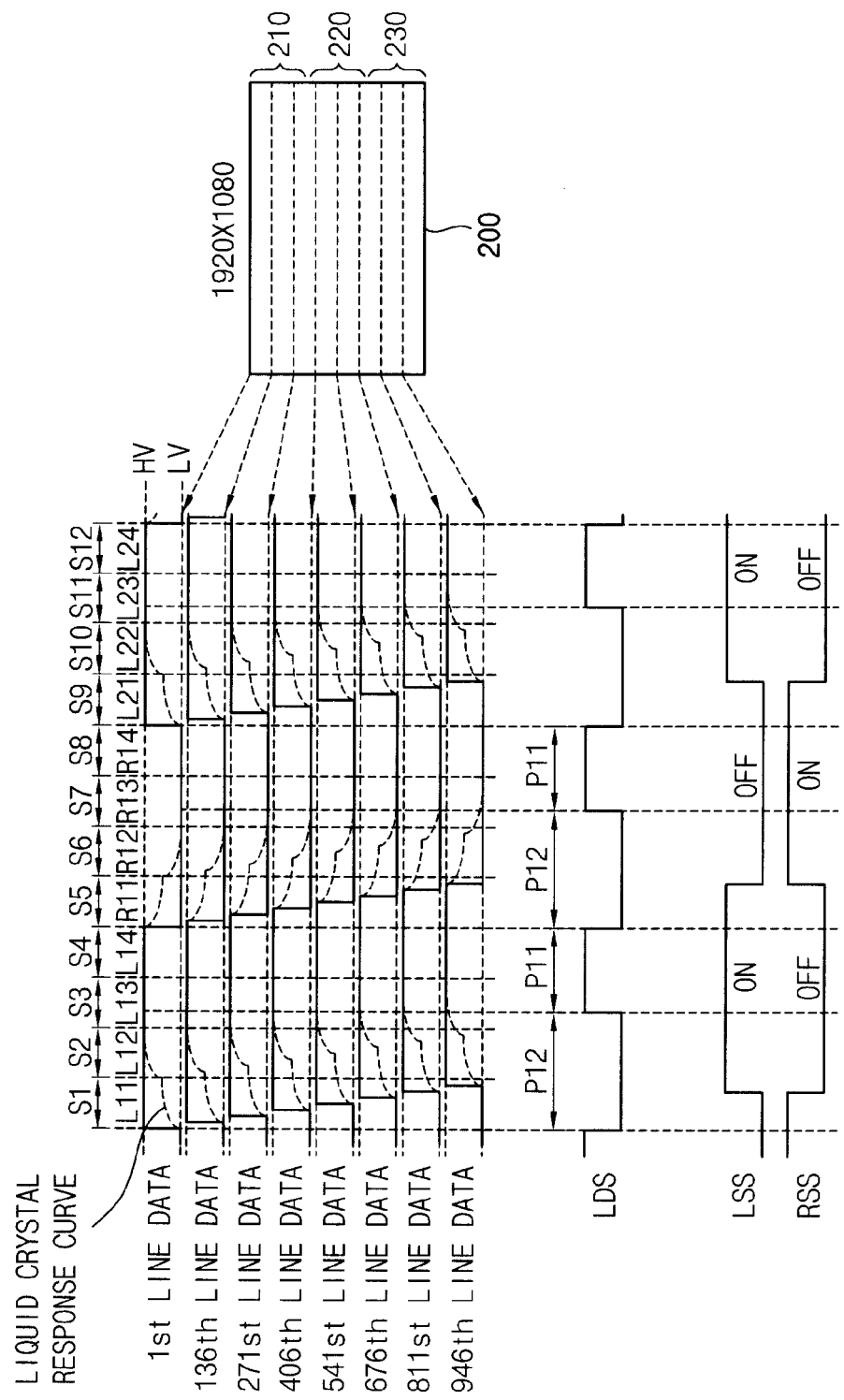
FIG. 6 is a schematic diagram explaining an exemplary embodiment of a driving method of the data correcting part of FIG. 3.

FIG. 6 is a schematic diagram explaining a driving method of the exemplary embodiment of a data correcting part 150 of FIG. 3.

In one exemplary embodiment, referring to FIGS. 1 and 6, the display panel 200 may have a resolution of 1920×1080, for example, but is not limited thereto. The panel driving part 300 controls the first to fourth left-eye images L11, L12, L13 and L14 and the first to fourth right-eye images R11, R12, R13 and R14 of about 480 Hz that are corrected in the data correcting part 150 to be displayed on the display panel 200. In the present exemplary embodiment, the first to fourth left-eye images L11, L12, L13 and L14 may be a white image and the first to fourth right-eye images R11, R12, R13 and R14 may be a black image, for example, but are not limited thereto. In one exemplary embodiment, a sub-interval in which the panel driving part 300 displays a frame image on the display panel 200 may be about 2 ms, and a main interval in which the panel driving part 300 displays stereoscopic images L11, L12, L13, L14, R11, R12, R13 and R14 on the display panel 200 may be about 16 ms, for example.

The panel driving part 300 sequentially provides a first horizontal line 1st LINE to a last horizontal line 1080th LINE of the display panel 200 with image data, during one sub-interval, in a progressive scan method.

The panel driving part 300 provides the display panel 200 with a data voltage of the first left-eye image L11 in a first sub-interval S1, provides the display panel 200 with a data voltage of the second left-eye image L12 in a second sub-interval S2, and provides the display panel 200 with a data voltage of the third left-eye image L13 in a third sub-interval S3. Moreover, the panel driving part 300 provides the display panel 200 with a data voltage of the fourth left-eye image L14 in a fourth sub-interval S4, provides the display panel 200 with a data voltage of the first right-eye image R11 in a fifth sub-interval S5, and provides the display panel 200 with a data voltage of the second right-eye image R12 in a sixth sub-interval S6. Moreover, the panel driving part 300 provides the display panel 200 with a data voltage of the third right-eye image R13 in a seventh sub-interval S7, and provides the display panel 200 with a data voltage of the fourth right-eye image R14 in an eighth sub-interval S8. In this case, the panel driving part 300 may output a high data voltage HV in correspondence with the first, second, third and fourth left-eye images L11, L12, L13 and L14 having a white gradation data, and may output a low data voltage LV in correspondence with the first, second, third and fourth right-eye images R11, R12, R13 and R14 having a black gradation data.

During a predetermined sub-interval, a left-eye image L and a right-eye image R are displayed on the display panel 200 in accordance with the progressive scan method. In one embodiment, for example, during an initial of a fifth sub-interval S5, an upper area 210 of the display panel 200 displays the first right-eye image R11, and intermediate and lower areas 220 and 230 display a fourth left-eye image L14 of a previous frame. During a middle of the fifth sub-interval S5, upper and intermediate areas 210 and 220 display the first right-eye image R11, and a lower area 230 displays the fourth left-eye image L14. During a latter of the fifth sub-interval S5, a whole area of the display panel 200 displays the first right-eye image R11. Thus, during the fifth sub-interval S5, the fourth left-eye image L14 and the first right-eye image R11 are displayed on the display panel 200.

A driving interval of the display panel 200 includes a first interval P11 in which the left-eye image or the right-eye image is displayed thereon and a second interval P12 in which the left-eye image L and the right-eye image R are combined to be displayed thereon.

In considering a response speed of liquid crystals included in the display panel 200, the first interval P11 may be substantially shorter than second, third and fourth sub-intervals S2, S3 and S4 (or sixth, seventh and eighth sub-intervals S6, S7 and S8) in which data of the left-eye image L or the right-eye image R is provided to the display panel 200, and the second interval P12 may be substantially longer than one sub-interval. The first interval P11 and the second interval P12 may be substantially different from each other in accordance with the response speed of liquid crystals.

The light source driving part 600 generates a light source driving signal which controls the light source part 500 providing the display panel 200 with lights, in synchronization with an image displayed on the display panel 200. The light source driving signal LDS turns on the light source part 500 during the first interval P11 in which the left-eye image L or the right-eye image R is displayed on the display panel 200, and turns off the light source part 500 during the second interval P12 in which the left-eye image L and the right-eye image R are displayed on the display panel 200. As a result, lights are provided to the display panel 200 during the first interval P11, and lights are not provided to the display panel 200 during the second interval P12.

The eyeglasses part 700 opens and closes the left-eye shutter 710 and the right-eye shutter 730 based on a left-eye shutter signal LSS and a right-eye shutter signal RSS that are synchronization with a driving of the display panel 200. In one embodiment, for example, the left-eye shutter signal LSS opens the left-eye shutter 710 during four sub-intervals in which the left-eye image L is displayed on the display panel 200, that is, from a portion of a first sub-interval S1 to a portion of a fifth sub-interval S5, and closes the left-eye shutter 710 during four sub-intervals in which the right-eye image R is displayed on the display panel 200, that is, from a portion of a fifth sub-interval S5 to a portion of a ninth sub-interval S9. The right-eye shutter signal RSS closes the right-eye shutter 730 during four sub-intervals in which the left-eye image L is displayed on the display panel 200, that is, from the portion of a first sub-interval S1 to the portion of a fifth sub-interval S5, and opens the right-eye shutter 730 during four sub-intervals in which the right-eye image R is displayed on the display panel 200, that is, from the portion of a fifth sub-interval S5 to a portion of the ninth sub-interval S9. Thus, the light source part 500 provides the display panel 200 with lights in an interval in which the left-eye image L or the right-eye image is displayed thereon, so that a crosstalk between the left-eye image L and the right-eye image R is not viewed by a viewer.

Figure 7:
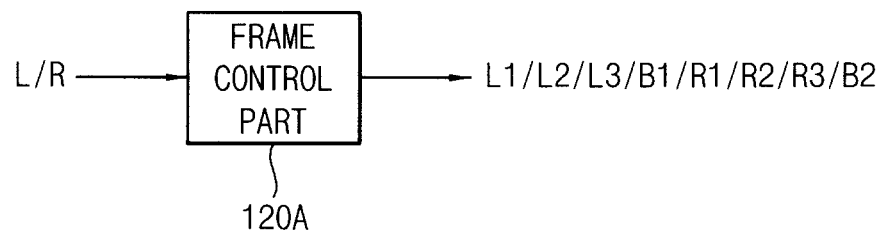
FIG. 7 is a schematic diagram explaining another exemplary embodiment of a frame control part.

FIG. 7 is a schematic diagram explaining another exemplary embodiment of a frame control part.

Referring to FIGS. 1 and 7, the present exemplary embodiment of the display apparatus is substantially the same as the display apparatus of FIG. 1 except for at least a frame control part 120A. Thus, any repetitive detailed explanation may hereinafter be omitted.

The frame control part 120A receives the left-eye image L and the right-eye image R. The frame control part 120A outputs k images for a left eye using the left-eye image L, and outputs k images for a right eye using the right-eye image R. In this case, i images of k images for the left eye and k images for the right eye may be changed into black images. Here, 'k' is a natural number greater than 2, and 'i' is a natural number greater than 0 and smaller than 'k'. When 'k' is 3 and 'i' is 1, the frame control part 120A repeats displaying the left-eye image L three times to generate three left-eye images and a black image, and repeats displaying the right-eye image R three times to generate three right-eye images and a black image.

The black image B is inserted between the left-eye image L and the right-eye image R, so that a time capable of correcting a slow falling response speed of liquid crystal may be secured. Thus, a duty ratio of a light source driving signal which turns on a light source part 600 is altered, so that luminance efficiency may be substantially enhanced.

Figure 8:
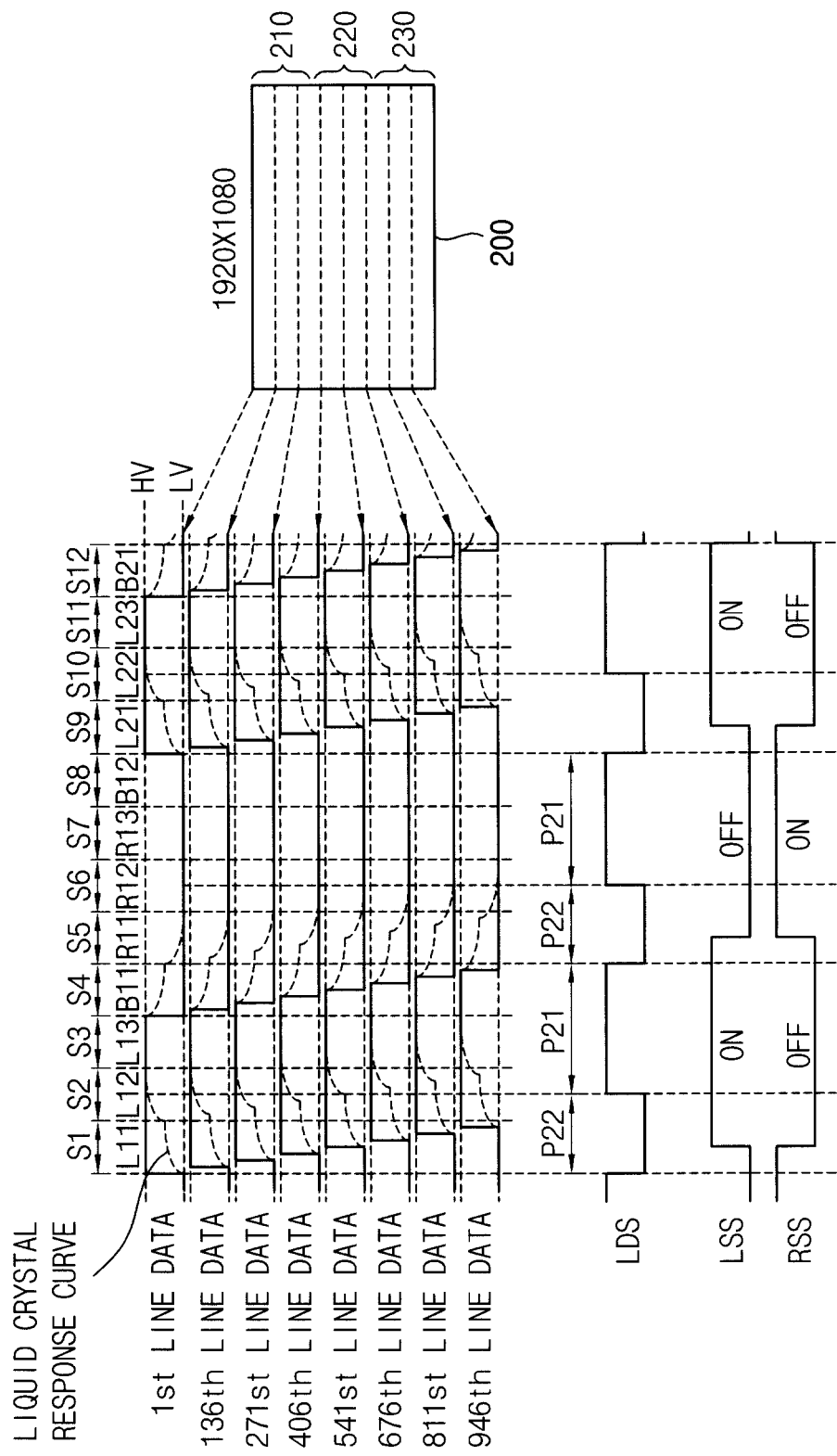
FIG. 8 is a schematic diagram explaining an exemplary embodiment of a driving method of a display apparatus including a frame control part of FIG. 7.

FIG. 8 is a schematic diagram explaining a driving method of a display apparatus including a frame control part of FIG. 7.

Referring to FIGS. 1, 7 and 8, the display panel 200 may have a resolution of 1920×1080, for example, but is not limited thereto. The panel driving part 300 controls a first left-eye image L11, a second left-eye image L2, a third left-eye image L13, a first black image B11, a first right-eye image R11, a second right-eye image R12, a third right-eye image R13 and a second black image B12 of about 480 Hz that are corrected in the data correcting part 150 to be displayed on the display panel 200. In one exemplary embodiment, a sub-interval in which the panel driving part 300 displays a frame image on the display panel 200 may be about 2 ms, and a main interval in which the panel driving part 300 displays stereoscopic images L11, L12, L13, B11, R11, R12, R13 and B12 on the display panel 200 may be about 16 ms, for example. The panel driving part 300 sequentially provides a first horizontal line 1st LINE to a last horizontal line 1080th LINE of the display panel 200 with image data, during one sub-interval, in a progressive scan method. The panel driving part 300 provides the display panel 200 with a data voltage corresponding to the first left-eye image L11 in a first sub-interval S1, provides the display panel 200 with a data voltage corresponding to the second left-eye image L12 in a second sub-interval S2, and provides the display panel 200 with a data voltage corresponding to the third left-eye image L13 in a third sub-interval S3. Moreover, the panel driving part 300 provides the display panel 200 with a data voltage corresponding to the first black image B11 in a fourth sub-interval S4, provides the display panel 200 with a data voltage corresponding to the first right-eye image R11 in a fifth sub-interval S5, and provides the display panel 200 with a data voltage corresponding to the second right-eye image R12 in a sixth sub-interval S6. Moreover, the panel driving part 300 provides the display panel 200 with a data voltage corresponding to the third right-eye image R13 in a seventh sub-interval S7, and provides the display panel 200 with a data voltage corresponding to the second black image B12 in an eighth sub-interval S8.

During the fifth sub-interval S5, the data of the first right-eye image R11 are sequentially provided to the first horizontal line 1st LINE to the last horizontal line 1080th LINE of the display panel 200. During an initial of the fifth sub-interval S5, an upper area 210 of the display panel 200 displays images varied from the first black image B11 of a previous frame to the first right-eye image R11, and middle and lower areas 220 and 230 of the display panel 200 displays the first image B11 of a previous frame. During an intermediate of the fifth sub-interval S5, the upper area 210 of the display panel 200 displays the first right-eye image R11, the middle area 220 of the display panel 200 displays images varied from the first black image B11 to the first right-eye image R11, and the lower area 230 of the display panel 200 displays the first black image B11. A latter of the fifth sub-interval S5, the upper and middle areas 210 and 220 display the first right-eye image R11, and the lower area 230 of the display panel 200 displays images varied from the first black image B11 to the first right-eye image R11.

The black image B11 is inserted between the third left-eye image L13 and the first right-eye image R11, so that the display panel 200 displaying the third left-eye image L13 is reset into a black status. Therefore, a falling time of liquid crystal molecules is secured in one frame when a data value of the first right-eye image R11 is black which is the worst condition of crosstalk, so that a first interval P21 displaying a left-eye image L or a right-eye image R on the display panel 200 is substantially increased. In contrast, the second interval P22 displaying an over image is substantially decreased, which is varied from the third left-eye image L13 to the first right-eye image R11 is displayed on the display panel 200 due to slow falling response characteristics of liquid crystal molecules. The first interval P21 and the second interval P22 may be substantially differently set in accordance with a response speed of liquid crystal molecules.

According to the present exemplary embodiment, the first interval P21 is greater than the first interval P11 shown in FIG. 6, and the second interval P22 is smaller than the second interval P12 shown in FIG. 6.

The light source driving part 600 generates a light source driving signal LDS driving the light source part 500 in synchronization with a driving interval of the display panel 200.

The light driving signal LDS turns on the light source part 500 while the first interval P21 in which the left-eye image L or the right-eye image R is displayed on the display panel 200, and turns off the light source part 500 while the second interval P22 in which the left-eye image L and the right-eye image R are displayed on the display panel 200. Accordingly, a duty ratio of the light source driving signal is greater than a duty ratio of the light source driving signal shown in FIG. 6, and thus luminance efficiency may be substantially enhanced.

The eyeglasses part 700 opens and closes the left-eye shutter 710 and the right-eye shutter 730 based on a left-eye shutter signal LSS and a right-eye shutter signal RSS that are synchronized to a driving of the display panel 200. The left-eye shutter signal LSS opens the left-eye shutter 710 during four sub-intervals in which the left-eye image L is displayed on the display panel 200, that is, from a portion of the first sub-interval S1 to a portion of the fifth sub-interval S5, and closes the left-eye shutter 710 during four sub-intervals in which the right-eye image R is displayed on the display panel 200, that is, from the portion of the fifth sub-interval S5 to a portion of a ninth sub-interval S9. The right-eye shutter signal RSS closes the right-eye shutter 730 during four sub-intervals in which the left-eye image L is displayed on the display panel 200, that is, from the portion of the first sub-interval S1 to the portion of the fifth sub-interval S5, and opens the right-eye shutter 730 during four sub-intervals in which the right-eye image R is displayed on the display panel 200, that is, from the portion of the fifth sub-interval S5 to the portion of the ninth sub-interval S9.

Accordingly, the light source part 500 provides the display panel 200 with lights in an interval in which the left-eye image L and the right-eye image R are displayed on the display panel 200, so that a crosstalk between the left-eye image L and the right-eye image R is not viewed by a viewer. Moreover, the black image B is inserted between the left-eye image L and the right-eye image R, so that luminance efficiency may be substantially enhanced.

Figure 9:
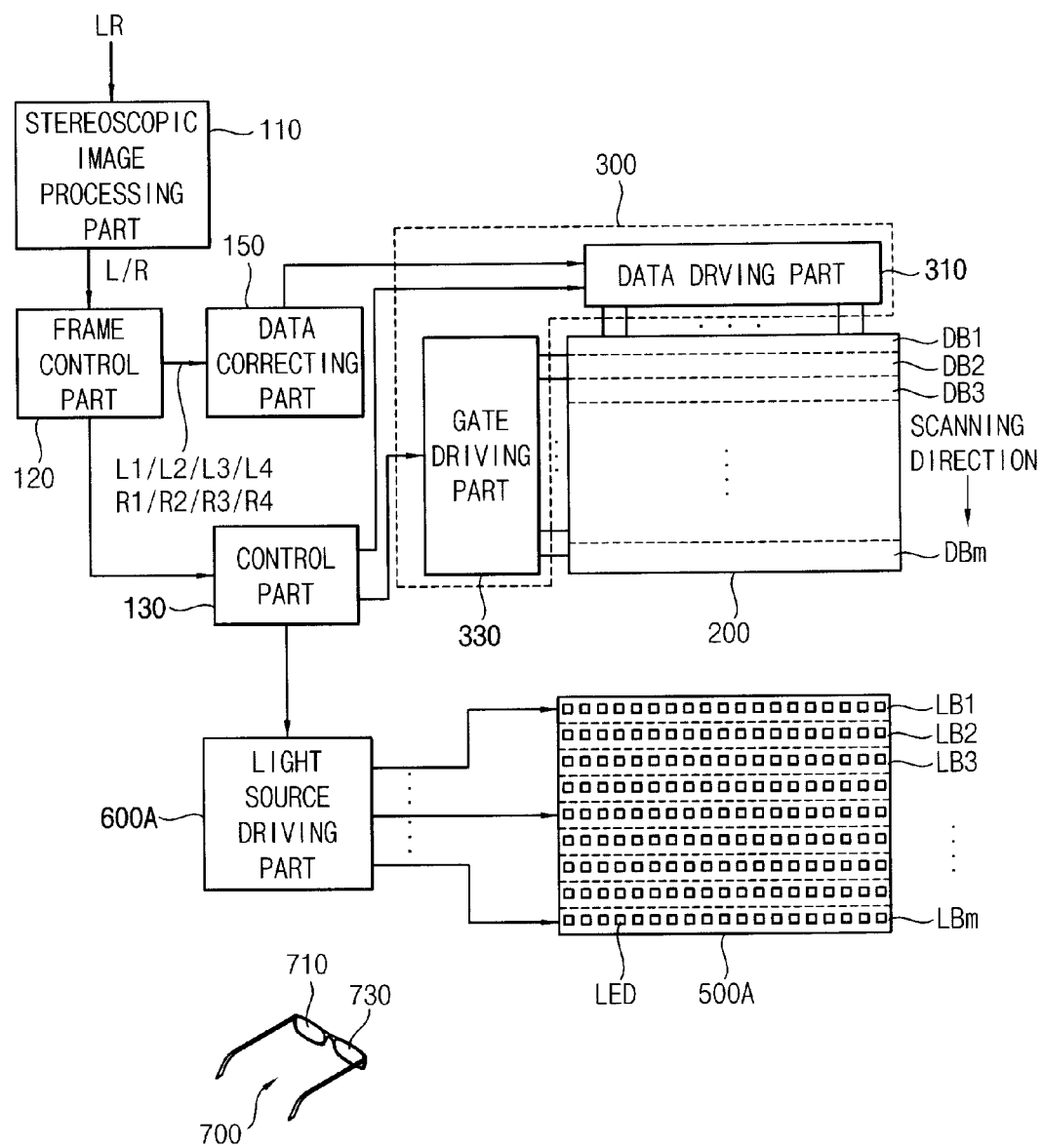
FIG. 9 is a block diagram illustrating another exemplary embodiment of a display apparatus.
Figure 10A:
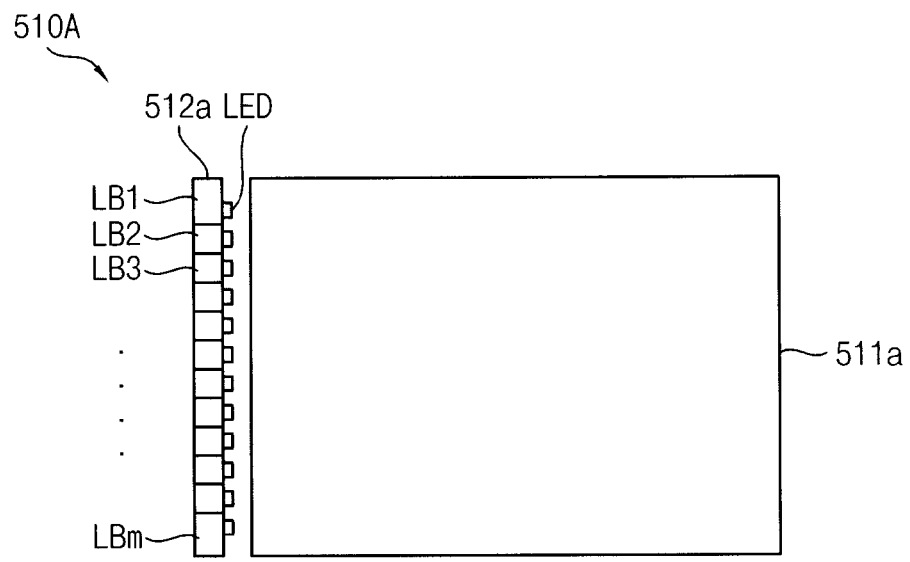
FIGS. 10A and 10B are block diagrams illustrating various exemplary embodiments of a light source part of FIG. 9.
Figure 10B:
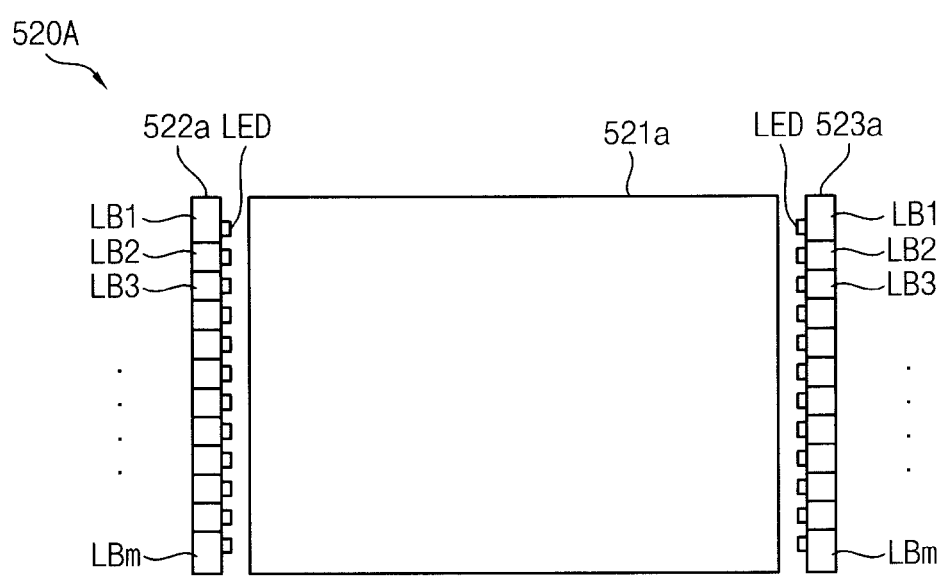

FIG. 9 is a block diagram illustrating another exemplary embodiment of a display apparatus. FIGS. 10A and 10B are block diagrams in accordance with various exemplary embodiments of a light source part of FIG. 9.

Referring to FIG. 9, the display apparatus includes stereoscopic image processing part 110, a frame control part 120, a control part 130, a data correcting part 150, a display panel 200, a panel driving part 300, a light source part 500A, a light source driving part 600A and an eyeglasses part 700

The display apparatus according to the present exemplary embodiment is substantially the same as the display apparatus of FIG. 1 except for at least a light source part 500A and a light source driving part 600A. Thus, identical reference numerals are used in FIG. 9 to refer to components that are the same or similar to those shown in FIG. 1, and thus, a detailed description thereof will be omitted.

The light source part 500A includes a plurality of LEDs to be disposed below the display panel 200. The LEDs may be defined as a plurality of light-emitting blocks LB1, LB2, LB3, ..., LBm that are arranged in the scan direction in which a frame image is displayed on the display panel 200. In this case, m is a natural number. In one exemplary embodiment, the light source part 500A may include a plurality of fluorescent lamps. The fluorescent lamps may be disposed in the scan direction in correspondence with the light-emitting blocks LB1, LB2, LB3, ..., LBm.

Moreover, the present exemplary embodiment of the display apparatus may include light source parts shown in FIGS. 10A and 10B.

In one exemplary embodiment, a light source part 510A shown in FIG. 10A includes an LGP 511a and a light-emitting module 512a disposed at a short side edge of the LGP 511a. The light-emitting module 512a has a plurality of LEDs mounted thereon. The light-emitting module 512a may be defined as a plurality of light-emitting blocks LB1, LB2, LB3, ..., LBm that are arranged in the scan direction. In this case, m is a natural number.

In one exemplary embodiment, a light source part 520A shown in FIG. 10B includes an LGP 521a, a first light-emitting module 522a disposed at a first short side edge of the LGP 521a and a second light-emitting module 523a disposed at a second short side edge of the LGP 521a. The first light-emitting module 522a has a plurality of LEDs mounted thereon. The first light-emitting module 522a may be defined as m light-emitting blocks LB1, LB2, LB3, ..., LBm that are arranged in the scan direction. The second light-emitting module 523a has a plurality of LEDs mounted thereon. The second light-emitting module 523a may be defined as m light-emitting blocks LB1, LB2, LB3, ..., LBm that face m light-emitting blocks LB1, LB2, LB3, ..., LBm of the first light-emitting module 522a. Each of the m light-emitting blocks LB1, LB2, LB3, ..., LBm of the second light-emitting module 523a is driven in synchronization with the m light-emitting blocks LB1, LB2, LB3, ..., LBm of the first light-emitting module 522a. In one embodiment, for example, a first light-emitting block LB1 of the first light-emitting module 522a and a first light-emitting block LB1 of the second light-emitting module 523a are driven by light source driving signals that are synchronization with each other.

The light source driving part 600A generates m light source driving signals which drive the light-emitting blocks LB1, LB2, B3, ..., LBm. In one embodiment, for example, m display blocks DB1, DB2, DB3, ..., DBm in the display panel 200 may be defined in correspondence with the light-emitting blocks LB1, LB2, LB3, ..., LBm. The light source driving part 600A generates a first light source driving signal. In this case, the first light source driving signal turns on a first light-emitting block LB1 in a first interval in which the left-eye image L or the right-eye image R is displayed on a first display block DB1 corresponding to a first light-emitting block LB1, and turns off the first light-emitting block LB1 in a second interval in which a combined image of the left-eye image L and the right-eye image R is displayed on the first display block DB1. In a similar method, the light source driving part 600A generates m light source driving signals.

FIG. 11 is a schematic diagram explaining an exemplary embodiment of a driving method of the display apparatus of FIG. 9.

In one exemplary embodiment, referring to FIGS. 9 and 11, the display panel 200 may have a resolution of 1920×1080, for example, but is not limited thereto. The panel driving part 300 controls the first to fourth left-eye images L11, L12, L13 and L14 and the first to fourth right-eye images R11, R12, R13 and R14 of about 480 Hz that are corrected in the data correcting part 150 to be displayed on the display panel 200. In one exemplary embodiment, a sub-interval in which the panel driving part 300 displays a frame image on the display panel 200 may be about 2 ms, and a main interval in which the panel driving part 300 displays stereoscopic images L11, L12, L13, L14, R11, R12, R13 and R14 on the display panel 200 may be about 16 ms, for example. The panel driving part 300 sequentially provides a first horizontal line 1st LINE to a last horizontal line 1080th LINE of the display panel 200 with image data, during one sub-interval, in a progressive scan method.

Data of right-eye images R11, R12, R13 and R14 are provided to a first horizontal line 1st LINE included in a first display block DB1 of the display panel 200 during fifth to eighth sub-intervals S5, S6, S7 and S8. A driving interval of the first display block DB1 has a first interval P31 in which a left-eye image L or a right-eye image R is displayed and a second interval P32 in which a left-eye image L and a right-eye image R are displayed. According to a response speed of liquid crystal, the first horizontal line 1st LINE displays a combined image in which the fourth left-eye image L14 and the first right-eye image R11 are combined during the second interval P32 from a fifth sub-interval S5 to a predetermined point. The first horizontal line 1st LINE displays the right-eye images R11, R12, R13 and R14 during the first interval P31 from the predetermined point to the eighth sub-interval S8. The first interval P31 and the second interval P32 may be substantially different from each other in accordance with the response speed of liquid crystals.

The light source driving part 600A generates a first light source driving signal LDS1 which is provided to a first light-emitting block LB1 corresponding to the first display block DB1, in synchronization with a driving interval of the first display block DB1. That is, the first light source driving signal LDS1 turns on the first light-emitting block LB1 during a first interval P31 in which the first display block DB1 displays the right-eye images R11, R12, R13 and R14, and turns off the first light-emitting block LB1 during a second interval P32 in which the first display block DB1 displays the combined image.

In a similar manner, the light source driving part 600A generates second to eighth light source driving signals LDS2, LDS3, . . . , LDS8 in synchronization with an image displayed on the second to eighth display blocks DB2, DB3, . . . , DB8 to control the second to eighth light-emitting blocks LB2, LB3, . . . , LB8.

In the present exemplary embodiment, the light source driving part 600A generates the light source driving signal which controls the light-emitting block in synchronization with an image displayed on the first horizontal lines of each display block. In one alternative exemplary embodiment, the light source driving part 600A may generate the light source driving signal in synchronization with an image displayed on a middle horizontal line or the last horizontal line. As a result, the light source driving part 600A may generate the light source driving signal which controls the light-emitting block in synchronization with an image displayed on the display block.

The eyeglasses part 700 opens and closes the left-eye shutter 710 and the right-eye shutter 730 based on a left-eye shutter signal LSS and a right-eye shutter signal RSS that is synchronized with a driving of the display panel 200. The eyeglasses part 700 opens the left-eye shutter 710 in response to the left-eye shutter signal LSS during an interval from a portion of sub-intervals S1, S2 and S3 corresponding to second intervals P32 in which the combined image is displayed on the first to eighth display blocks DB1, DB2, . . . , DB8 to a portion of sub-intervals S5, S6 and S7 corresponding to second intervals P32 in which a following combined image is displayed on the first to eighth display blocks DB1, DB2, . . . , DB8. The eyeglasses part 700 closes the left-eye shutter 710 in response to the left-eye shutter signal LSS during an interval from the portion of sub-intervals S5, S6 and S7 corresponding to the second intervals P32 in which the combined image is displayed on the first to eighth display blocks DB1, DB2, . . . , DB8 to a portion of sub-intervals S9, S10 and S11 corresponding to the second intervals P32 in which a following combined image is displayed on the first to eighth display blocks DB1, DB2, . . . , DB8. The eyeglasses part 700 closes the right-eye shutter 730 in response to the right-eye shutter signal RSS during an interval from the portion of sub-intervals S1, S2 and S3 corresponding to the second intervals P32 in which the combined image is displayed on the first to eighth display blocks DB1, DB2, . . . , DB8 to the portion of sub-intervals S5, S6 and S7 corresponding to second intervals P32 in which a following combined image is displayed on the first to eighth display blocks DB1, DB2, . . . , DB8. The eyeglasses part 700 opens the right-eye shutter 730 in response to the right-eye shutter signal RSS during an interval from the portion of sub-intervals S5, S6 and S7 corresponding to the second intervals P32 in which the combined image is displayed on the first to eighth display blocks DB1, DB2, . . . , DB8 to the portion of sub-intervals S9, S10 and S11 corresponding to the second intervals P32 in which a following combined image is displayed on the first to eighth display blocks DB1, DB2, . . . , DB8.

Accordingly, lights are provided to the display panel 200 in an interval in which the left-eye image L or the right-eye image R is displayed on the display panel 200, so that a crosstalk between the left-eye image L and the right-eye image R is not viewed by a viewer.

Figure 12:
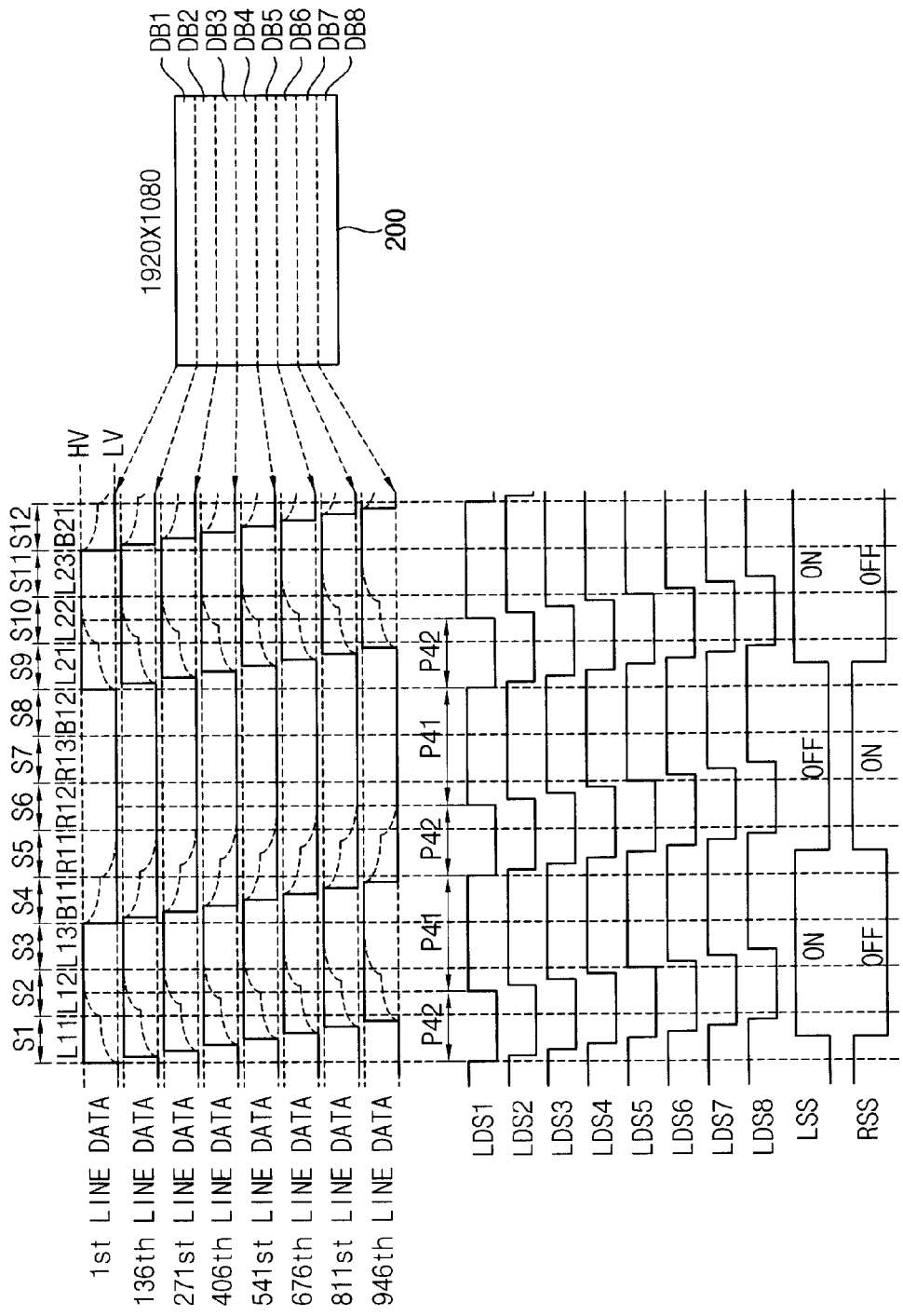
FIG. 12 is a schematic diagram explaining another exemplary embodiment of a driving method of a display apparatus.

FIG. 12 is a schematic diagram explaining another exemplary embodiment of a driving method of a display apparatus.

Referring to FIG. 12, the present exemplary embodiment of the display apparatus is substantially the same as the display apparatus of FIG. 9 except for at least a frame control part, and a frame control part according to the present exemplary embodiment is substantially the same as the frame control part 120A of FIG. 7. Thus, any repetitive detailed explanation may hereinafter be omitted.

Hereinafter, the present exemplary embodiment a driving method of a display apparatus will be described below with reference to FIGS. 9 and 12.

In the present exemplary embodiment, the display panel 200 may have a resolution of 1920×1080, for example, but is not limited thereto. The panel driving part 300 controls a first left-eye image L11, a second left-eye image L2, a third left-eye image L13, a first black image B11, a first right-eye image R11, a second right-eye image R12, a third right-eye image R13 and a second black image B12 of about 480 Hz that are corrected in the data correcting part 150 to be displayed on the display panel 200. In one exemplary embodiment, a sub-interval in which the panel driving part 300 displays a frame image on the display panel 200 may be about 2 ms, and a main interval in which the panel driving part 300 displays stereoscopic images L11, L12, L13, B11, R11, R12, R13 and B12 on the display panel 200 may be about 16 ms, for example.

Data of a first black image B11 are provided to a first horizontal line 1st LINE included in a first display block DB1 of the display panel 200 during a fourth sub-interval S4. Then, data of right-eye images R11, R12 and R13 are provided to the first horizontal line 1st LINE during fifth to seventh sub-intervals S5, S6 and S7.

The first horizontal line 1st LINE is varied from a third left-eye image L13 of a previous frame to the first black image B11 during the fourth sub-interval S4. The first horizontal line 1st LINE is varied to the first right-eye image R11 during a second interval P42 from a fifth sub-interval S5 in which a data of the first right-eye image R11 is provided to a predetermined point. The first horizontal line 1st LINE displays the right-eye images R11, R12 and R13 during a first interval P41 from the predetermined point to the eighth sub-interval S8.

The second interval P42 is an interval which is varied from the first black image B11 to the first right-eye image R11. The second interval P42 is substantially shorter than a second interval P32 shown in FIG. 11, that is, an interval which is varied from a fourth left-eye image L14 to a first right-eye image R11. As a result, the first interval P41 which displays the first right-eye image R11 on the first horizontal line 1st LINE is substantially long. According to the present exemplary embodiment, the first interval P41 is substantially longer than the first interval P31 shown in FIG. 11, and the second interval P42 is substantially shorter than the second interval P32 shown in FIG. 11. The first interval P41 and the second interval P42 may be substantially different from each other in accordance with the response speed of liquid crystals.

The light source driving part 600A generates a first light source driving signal LDS1 which is provided to a first light-emitting block LB1 corresponding to the first display block DB1 in synchronization with a driving interval of the first display block DB1. That is, the first light source driving signal LDS1 turns on the first light-emitting block LB1 during a first interval P41 in which the first display block DB1 displays the left-eye images L12 and R13, and turns off the first light-emitting block LB1 during a second interval P42 in which the first display block DB1 displays the combined image.

Accordingly, in a similar method, the light source driving part 600A generates second to eighth light source driving signals LDS2, LDS3, . . . , LDS8 in synchronization with an image displayed on the second to eighth display blocks DB2, DB3, . . . , DB8 to control the second to eighth light-emitting blocks LB2, LB3, . . . , LB8.

In the present exemplary embodiment, the light source driving part 600A generates the light source driving signal which controls the light-emitting block in synchronization with an image displayed on the first horizontal lines of each display block, but in one alternative exemplary embodiment, the light source driving part 600A may generate the light source driving signal in synchronization with an image displayed on a middle horizontal line or the last horizontal line. As a result, the light source driving part 600A may generate the light source driving signal which controls the light-emitting block in synchronization with an image displayed on the display block.

The eyeglasses part 700 opens and closes the left-eye shutter 710 and the right-eye shutter 730 based on a left-eye shutter signal LSS and a right-eye shutter signal RSS that are synchronized to a driving of the display panel 200. The eyeglasses part 700 opens the left-eye shutter 710 in response to the left-eye shutter signal LSS during an interval from a portion of sub-intervals S1, S2 and S3 corresponding to second intervals P42 in which the combined image is displayed on the first to eighth display blocks DB1, DB2, . . . , DB8 to a portion of sub-intervals S5, S6 and S7 corresponding to second intervals P42 in which a following combined image is displayed on the first to eighth display blocks DB1, DB2, . . . , DB8. The eyeglasses part 700 closes the left-eye shutter 710 in response to the left-eye shutter signal LSS during an interval from the portion of sub-intervals S5, S6 and S7 corresponding to the second intervals P42 in which the combined image is displayed on the first to eighth display blocks DB1, DB2, . . . , DB8 to a portion of sub-intervals S9, S10 and S11 corresponding to the second intervals P42 in which a following combined image is displayed on the first to eighth display blocks DB1, DB2, . . . , DB8. The eyeglasses part 700 closes the right-eye shutter 730 in response to the right-eye shutter signal RSS during an interval from a portion of sub-intervals S1, S2 and S3 corresponding to the second intervals P32 in which the combined image is displayed on the first to eighth display blocks DB1, DB2, . . . , DB8 to a portion of sub-intervals S5, S6 and S7 corresponding to second intervals P42 in which a following combined image is displayed on the first to eighth display blocks DB1, DB2, . . . , DB8. The eyeglasses part 700 opens the right-eye shutter 730 in response to the right-eye shutter signal RSS during an interval from a portion of sub-intervals S5, S6 and S7 corresponding to the second intervals P42 in which the combined image is displayed on the first to eighth display blocks DB1, DB2, . . . , DB8 to a portion of sub-intervals S9, S10 and S11 corresponding to the second intervals P42 in which a following combined image is displayed on the first to eighth display blocks DB1, DB2, . . . , DB8.

Accordingly, lights are provided to the display panel 200 in an interval in which the left-eye image L or the right-eye image R is displayed on the display panel 200, so that a crosstalk between the left-eye image L and the right-eye image R is not viewed by a viewer.

The black image is inserted between the left-eye image and the right-eye image, so that a time in which a current right-eye image is displayed may be substantially decreased with respect to a previous left-eye image. Thus, it may substantially increase a duty ratio of a light source driving signal which turns on the light source part 600A to substantially enhance a luminance efficiency of a display apparatus.

Figure 13:
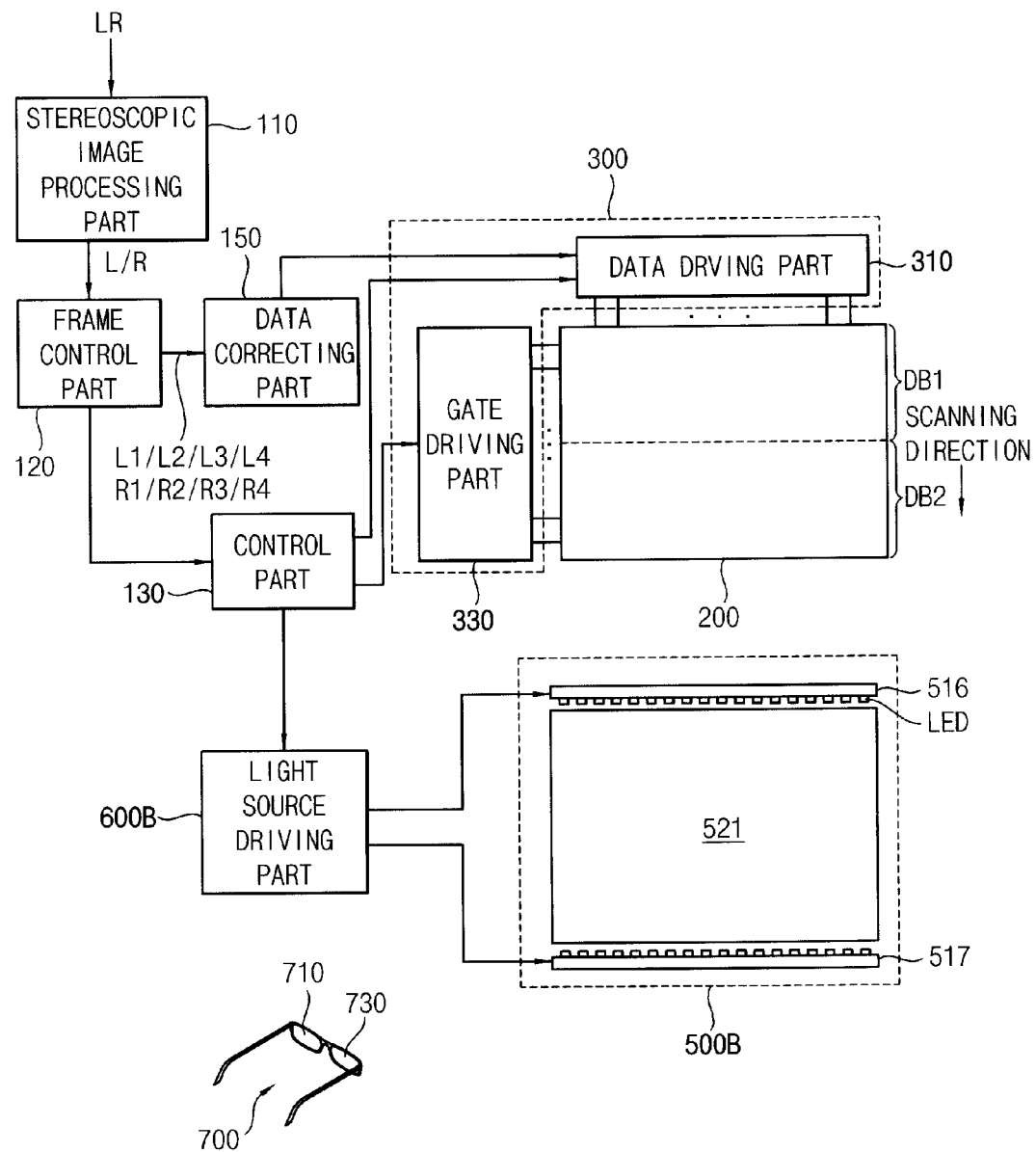
FIG. 13 is a block diagram illustrating another exemplary embodiment of a display apparatus.

FIG. 13 is a block diagram illustrating another exemplary embodiment of a display apparatus.

Referring to FIG. 13, the display apparatus includes a stereoscopic image processing part 110, a frame control part 120, a control part 130, a data correcting part 150, a display panel 200, a panel driving part 300, a light source part 500B, a light source driving part 600B and an eyeglasses part 700.

The present exemplary embodiment of the display apparatus is substantially the same as the display apparatus of FIG. 1 except for at least a light source part 500B and a light source driving part 600B. Thus, identical reference numerals are used in FIG. 13 to refer to components that are the same or like those shown in FIG. 1, and thus, a detailed description thereof will be omitted.

The light source part 500B includes a first light-emitting module 516, a second light-emitting module 517 and an LGP 521. The first light-emitting module 516 including a plurality of LEDs mounted thereon may be disposed on a first side of the LGP 521. The first side of the LGP 521 is substantially perpendicular to a scan direction of an image. The second light-emitting module 517 including a plurality of LEDs mounted thereon may be disposed on a second side facing the first side of the LGP521. As a result, the first light-emitting module 516 may be disposed in an upper side of the display panel 200, and the second light-emitting module 517 may be disposed in a lower side of the display panel 200.

In one exemplary embodiment, the light source part 500B may include a first fluorescent lamp and a second fluorescent lamp. The first fluorescent lamp may be disposed at the first side of the LGP 521, and the second fluorescent lamp may be disposed at the second side of the LGP 521.

The light source part 600B generates a first light source driving signal driving the first light-emitting module 516 and a second light source driving signal driving the second light-emitting module 517. In one embodiment, for example, the display panel 200 may be defined as a first display block DB1 and a second display block DB2 in correspondence with the first and second light-emitting modules 516 and 517. The light source driving part 600B generates a first light source driving signal which turns on the first light-emitting module 516 when a left-eye image (or a right-eye image) is displayed on the first display block DB1 and which turns off the first light-emitting module 516 when the left-eye image and the right-eye image are displayed on the first display block DB1. Moreover, the light source driving part 600B generates a first light source driving signal which turns on the second light-emitting module 517 when a left-eye image (or a right-eye image) is displayed on the second display block DB2 and which turns off the second light-emitting module 517 when the left-eye image and the right-eye image are displayed on the second display block DB2. As a result, the light source part 500B is driven in accordance with a control of the light source driving part 600B.

Figure 14:
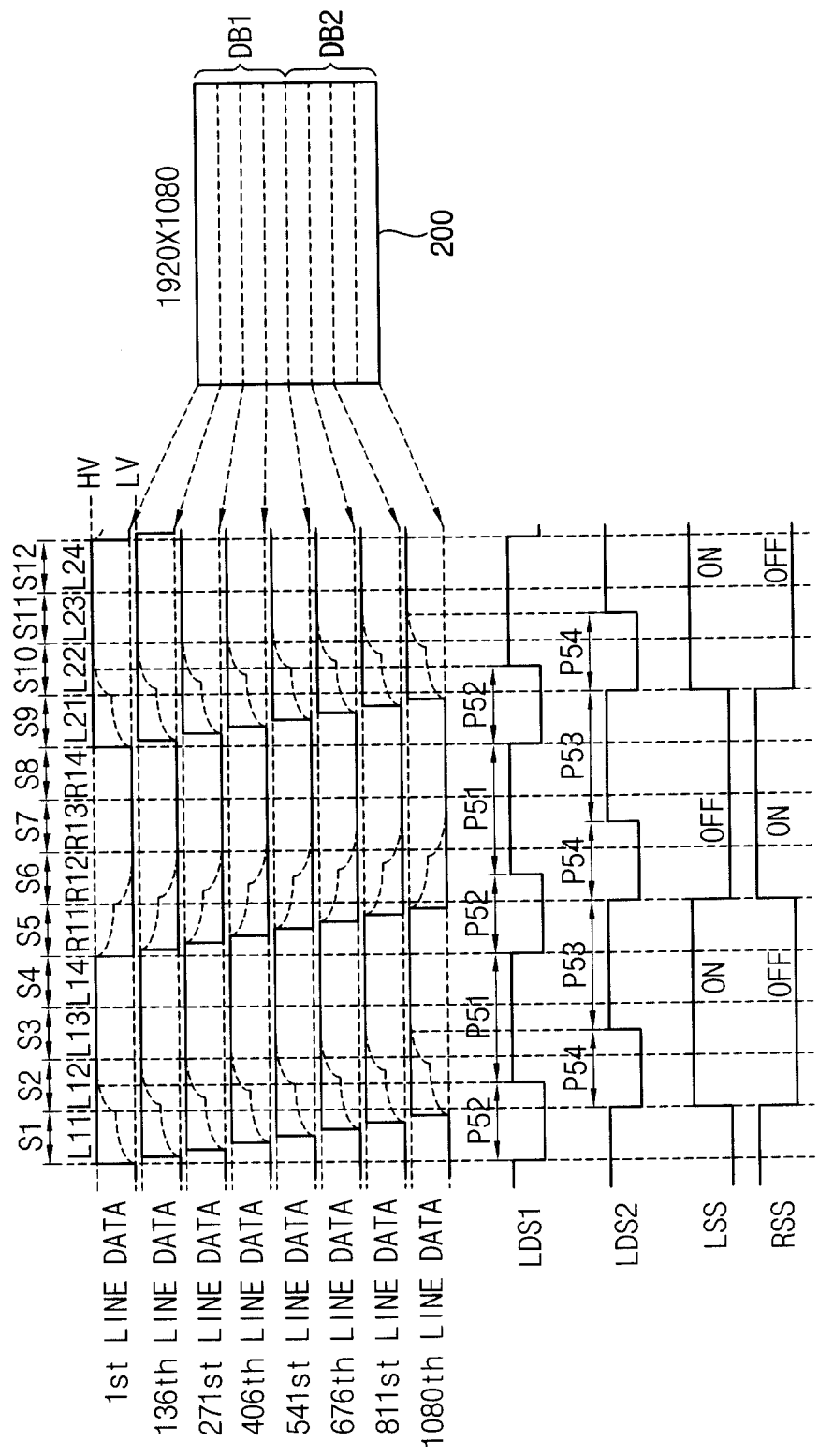
FIG. 14 is a schematic diagram explaining an exemplary embodiment of a driving method of the display apparatus of FIG. 13.

FIG. 14 is a schematic diagram explaining an exemplary embodiment of a driving method of the display apparatus of FIG. 13.

In one exemplary embodiment, referring to FIGS. 13 and 14, the display panel 200 may have a resolution of 1920× 1080, for example, but is not limited thereto. The panel driving part 300 controls the first to fourth left-eye images L11, L12, L13 and L14 and the first to fourth right-eye images R11, R12, R13 and R14 of about 480 Hz that are corrected in the data correcting part 150 to be displayed on the display panel 200. In one exemplary embodiment, a sub-interval in which the panel driving part 300 displays a frame image on the display panel 200 may be about 2 ms, and a main interval in which the panel driving part 300 displays stereoscopic images L11, L12, L13, L14, R11, R12, R13 and R14 on the display panel 200 may be about 16 ms, for example. The panel driving part 300 sequentially provides a first horizontal line 1st LINE to a last horizontal line 1080th LINE of the display panel 200 with image data, during one sub-interval, in a progressive scan method.

Data of right-eye images R11, R12, R13 and R14 are provided to a first horizontal line 1st LINE included in a first display block DB1 of the display panel 200 during fifth to eighth sub-intervals S5, S6, S7 and S8. A driving interval of the first display block DB1 has a first interval P51 in which a left-eye image L or a right-eye image R is displayed and a second interval P52 in which a left-eye image L and a right-eye image R are displayed. According to a response speed of liquid crystal, the first horizontal line 1st LINE displays a combined image in which the fourth left-eye image L14 and the first right-eye image R11 are combined during the second interval P52 from a fifth sub-interval S5 to a predetermined point. The first horizontal line 1st LINE displays the right-eye images R11, R12, R13 and R14 during the first interval P51 from the predetermined point to the eighth sub-interval S8.

Data of right-eye images R11, R12, R13 and R14 are provided to the last horizontal line 1080th LINE of the second display block DB2 during a sixth sub-interval S6 to a ninth sub-intervals S9. A driving interval of the second display block DB2 has a third interval P53 in which a left-eye image L or a right-eye image R is displayed and a fourth interval P54 in which a left-eye image L and a right-eye image R are displayed. According to a response speed of liquid crystal, the last horizontal line 1080th LINE is varied from a fourth left-eye image L14 of a previous frame to the first right-eye image R11, during the fourth interval P54 from the sixth sub-interval S6 to a predetermined point.

Thus, the last horizontal line 1080th LINE displays a combined image in which the fourth left-eye image L14 and the first right-eye image R11 are combined. The last horizontal line 1080th LINE displays the right-eye images R11, R12, R13 and R14 during the third interval P53 from the predetermined point to the ninth sub-interval S9. The first, second, third and fourth intervals P51, P52, P53 and P54 may be substantially different from each other in accordance with the response speed of liquid crystals.

The light source driving part 600B generates a first light source driving signal LDS1 and a second light source driving signal LDS2 that are provided to first and second light-emitting modules 516 and 517 corresponding to the first and second display blocks DB1 and DB2, respectively. The first light source driving signal LDS1 turns on the first light-emitting module 516 during a first interval P51 in which the first display block DB1 displays the first right-eye image R11, and turns off the first light-emitting module 516 during a second interval P52 in which the first display block DB1 displays the combined image, in synchronization with an image displayed on the first horizontal line 1st LINE of the first display block DB1. The second light source driving signal LDS2 turns on the second light-emitting module 517 during a third interval P53 in which the second display block DB2 displays the first right-eye image R11, and turns off the second light-emitting module 517 during a fourth interval P54 in which the second display block DB2 displays the combined image, in synchronization with an image displayed on the last horizontal line 1080th LINE of the second display block DB2.

In the present exemplary embodiment, a first light source driving signal which controls the first light-emitting module 516 is generated in synchronization with an image displayed on a first horizontal line of the first display block DB1 adjacent to the first light-emitting module 516, but in one alternative exemplary embodiment, the first light source driving signal may be generated in synchronization with an image displayed on one of horizontal lines of the first display block DB1. Moreover, in the present exemplary embodiment, a second light source driving signal which controls the second light-emitting module 517 is generated in synchronization with an image displayed on the last horizontal line of the second display block DB2 adjacent to the second light-emitting module 517, but in one alternative exemplary embodiment, the second light source driving signal may be generated in synchronization with an image displayed on one of horizontal lines of the second display block DB2. As a result, the light source driving part 600B may generate the light source driving signal which controls the light-emitting block in synchronization with an image displayed on the display block.

The eyeglasses part 700 opens and closes the left-eye shutter 710 and the right-eye shutter 730 based on a left-eye shutter signal LSS and a right-eye shutter signal RSS that are synchronized to a driving of the display panel 200. The eyeglasses part 700 opens the left-eye shutter 710 in response to the left-eye shutter signal LSS during an interval from a portion of sub-intervals S1, S2 and S3 corresponding to second intervals P52 and P54 in which the combined image is displayed on the first and second display blocks DB1 and DB2 to a portion of sub-intervals S5, S6 and S7 corresponding to second intervals P52 and P54 in which a following combined image is displayed on the first and second display blocks DB1 and DB2. The eyeglasses part 700 closes the left-eye shutter 710 in response to the left-eye shutter signal LSS during an interval from the portion of sub-intervals S5, S6 and S7 corresponding to the second intervals P52 and P54 in which the combined image is displayed on the first and second display blocks DB1 and DB2 to a portion of sub-intervals S9, S10 and S11 corresponding to the second intervals P52 and P54 in which a following combined image is displayed on the first and second display blocks DB1 and DB2. The eyeglasses part 700 closes the right-eye shutter 730 in response to the right-eye shutter signal RSS during an interval from the portion of sub-intervals S1, S2 and S3 corresponding to the second intervals P52 and P54 in which the combined image is displayed on the first and second display blocks DB1 and DB2 to the portion of sub-intervals S5, S6 and S7 corresponding to second intervals P52 and P54 in which a following combined image is displayed on the first and second display blocks DB1 and DB2. The eyeglasses part 700 opens the right-eye shutter 730 in response to the right-eye shutter signal RSS during an interval from the portion of sub-intervals S5, S6 and S7 corresponding to the second intervals P52 and P54 in which the combined image is displayed on the first and second display blocks DB1 and DB2 to the portion of sub-intervals S9, S10 and S11 corresponding to the second intervals P52 and P54 in which a following combined image is displayed on the first and second display blocks DB1 and DB2.

Accordingly, lights are provided to the display panel 200 in an interval in which the left-eye image L or the right-eye image R is displayed on the display panel 200, so that a crosstalk between the left-eye image L and the right-eye image R is not viewed by a viewer.

Figure 15:
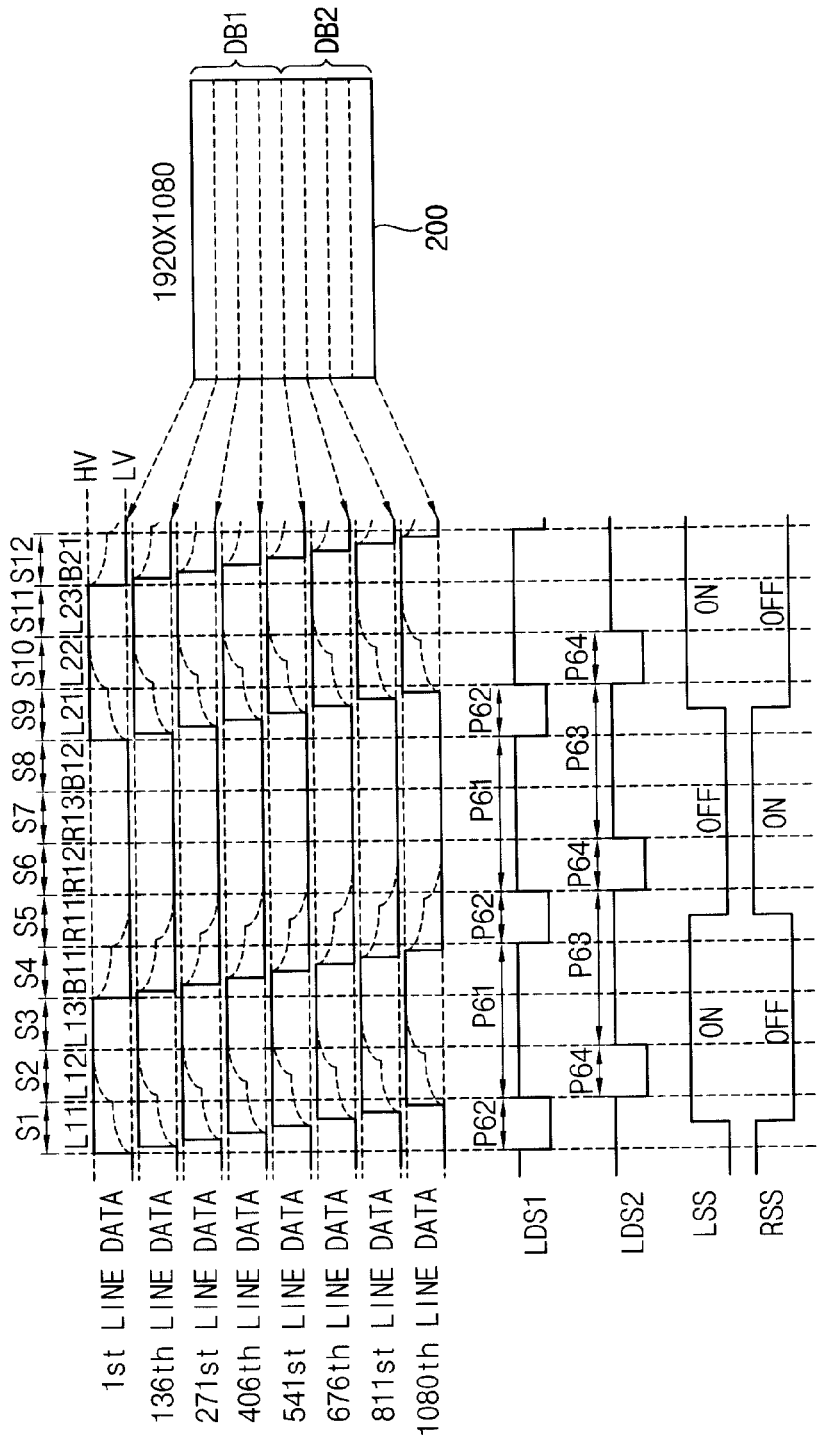
FIG. 15 is a schematic diagram explaining another exemplary embodiment of a driving method of a display apparatus.

FIG. 15 is a schematic diagram explaining a driving method of a display apparatus according to another exemplary embodiment of the invention.

Referring to FIG. 15, the display apparatus according to the present exemplary embodiment is substantially the same as the display apparatus of FIG. 13 except for at least a frame control part, and a frame control part according to the present exemplary embodiment is substantially the same as the frame control part 120A of FIG. 7. Thus, any repetitive detailed explanation may hereinafter be omitted.

Hereinafter, the present exemplary embodiment of a driving method of a display apparatus will be described below with reference to FIGS. 13 and 15.

In the present exemplary embodiment, the display panel 200 may have a resolution of 1920×1080, for example, but is not limited thereto. The panel driving part 300 controls that a first left-eye image L11, a second left-eye image L2, a third left-eye image L13, a first black image B11, a first right-eye image R11, a second right-eye image R12, a third right-eye image R13 and a second black image B12 of about 480 Hz that are corrected in the data correcting part 150 are displayed on the display panel 200. In one exemplary embodiment, a sub-interval in which the panel driving part 300 displays a frame image on the display panel 200 may be about 2 ms, and a main interval in which the panel driving part 300 displays stereoscopic images L11, L12, L13, B11, R11, R12, R13 and B12 on the display panel 200 may be about 16 ms, for example. The panel driving part 300 sequentially provides a first horizontal line 1st LINE to a last horizontal line 1080th LINE of the display panel 200 with image data, during one sub-interval, in a progressive scan method.

Data of a first black image B11 are provided to a first horizontal line 1st LINE included in a first display block DB1 of the display panel 200 during a fourth sub-interval S4. Then, data of right-eye images R11, R12 and R13 are provided to the first horizontal line 1st LINE during fifth to seventh sub-intervals S5, S6 and S7. A driving interval of the first display block DB1 has a first interval P61 in which a left-eye image L or a right-eye image R is displayed and a second interval P62 in which a left-eye image L and a right-eye image R are displayed. The first horizontal line 1st LINE is varied from a third left-eye image L13 of a previous frame to the first black image B11 during the fourth sub-interval S4. The first horizontal line 1st LINE is varied to the first right-eye image R11 during a second interval P62 from a fifth sub-interval S5 in which a data of the right-eye images R11, R12 and R13 are provided to a predetermined point. The first horizontal line 1st LINE displays the right-eye images R11, R12 and R13 during a first interval P61 from the predetermined point to the eighth sub-interval S8.

The second interval P62 is an interval which is varied from the first black image B11 to the first right-eye image R11. The second interval P62 is substantially shorter than a second interval P52 shown in FIG. 14, that is, an interval which is varied from a fourth left-eye image L14 to a first right-eye image R11. That is, the first interval P61 which displays the first right-eye image R11 on the first horizontal line 1st LINE is substantially long. According to the present exemplary embodiment, the first interval P61 is substantially longer than the first interval P51 shown in FIG. 14, and the second interval P62 is substantially shorter than the second interval P52 shown in FIG. 14.

Data of the first black image B11 is provided to the last horizontal line 1080th LINE of the second display block DB2 during a latter portion of a fourth sub-interval S4 close to a fifth sub-interval S5. Then, data of the right-eye images R11, R23 and R13 are provided to the last horizontal line 1080th LINE during sixth, seventh and eighth sub-intervals S6, S7 and S8. A driving interval of the display block DB2 has a third interval P63 in which a left-eye image L or a right-eye image R is displayed and a fourth interval P64 in which the left-eye image L and the right-eye image R are displayed. In the last horizontal line 1080th LINE, during the fifth sub-interval S5, a third left-eye image L13 of a previous frame is varied to the first black image B11. During the fourth interval P64 from a sixth sub-interval S6 in which data of the first right-eye image R11 is provided to a predetermined point, an image varied to the first right-eye image R11 is displayed on the last horizontal line 1080th LINE. In addition, during the third interval P63 from the predetermined point to the ninth sub-interval S9, the right-eye images R11, R12 and R13 are displayed on the last horizontal line 1080th LINE.

The fourth interval P64 is an interval which is varied from the first black image B11 to the first right-eye image R11. The fourth interval P64 is substantially shorter than a fourth interval P54 shown in FIG. 14, that is, an interval which is varied from a fourth left-eye image L14 to a first right-eye image R11. As a result, the fourth interval P64 which displays the first right-eye image R11 on the last horizontal line 1080th LINE is substantially long. According to the present exemplary embodiment, the third interval P63 is substantially longer than the third interval P53 shown in FIG. 14, and the fourth interval P64 is substantially shorter than the fourth interval P54 shown in FIG. 14. The first, second, third and fourth intervals P61, P62, P63 and P64 may be substantially different from each other in accordance with the response speed of liquid crystals.

The light source driving part 600B generates a first light source driving signal LDS1 and a second light source driving signal LDS2 that are provided to first and second light-emitting modules 516 and 517 corresponding to the first and second display blocks DB1 and DB2, respectively. The first light source driving signal LDS1 turns on the first light-emitting module 516 during a first interval P61 in which the first display block DB1 displays the first right-eye image R11, and turns off the first light-emitting module 516 during a second interval P62 in which the first display block DB1 displays the combined image, in synchronization with an image displayed on the first horizontal line 1st LINE of the first display block DB1. The second light source driving signal LDS2 turns on the second light-emitting module 517 during a third interval P63 in which the second display block DB2 displays the first right-eye image R11, and turns off the second light-emitting module 517 during a fourth interval P64 in which the second display block DB2 displays the combined image, in synchronization with an image displayed on the last horizontal line 1080th LINE of the second display block DB2.

In the present exemplary embodiment, a first light source driving signal which controls the first light-emitting module is generated in synchronization with an image displayed on a first horizontal line of the first display block, but in one alternative exemplary embodiment, the first light source driving signal may be generated in synchronization with an image displayed on one of horizontal lines of the first display block. Moreover, in the present exemplary embodiment, a second light source driving signal which controls the second light-emitting module is generated in synchronization with an image displayed on the last horizontal line of the second display block, but in one alternative exemplary embodiment, the second light source driving signal may be generated in synchronization with an image displayed on one of horizontal lines of the second display block. As a result, the light source driving part 600B may generate the light source driving signal which controls the light-emitting block in synchronization with an image displayed on the display block.

The eyeglasses part 700 opens and closes the left-eye shutter 710 and the right-eye shutter 730 based on a left-eye shutter signal LSS and a right-eye shutter signal RSS that are synchronized to a driving of the display panel 200. The eyeglasses part 700 opens the left-eye shutter 710 in response to the left-eye shutter signal LSS during an interval from a portion of sub-intervals S1 and S2 corresponding to second intervals P62 and P64 in which the combined image is displayed on the first and second display blocks DB1 and DB2 to a portion of sub-intervals S5 and S6 corresponding to second intervals P62 and P64 in which a following combined image is displayed on the first and second display blocks DB1 and DB2. The eyeglasses part 700 closes the left-eye shutter 710 in response to the left-eye shutter signal LSS during an interval from the portion of sub-intervals S5 and S6 corresponding to the second intervals P62 and P64 in which the combined image is displayed on the first and second display blocks DB1 and DB2 to a portion of sub-intervals S9 and S10 corresponding to the second intervals P62 and P64 in which a following combined image is displayed on the first and second display blocks DB1 and DB2. The eyeglasses part 700 closes the right-eye shutter 730 in response to the right-eye shutter signal RSS during an interval from the portion of sub-intervals S1 and S2 corresponding to the second intervals P62 and P64 in which the combined image is displayed on the first and second display blocks DB1 and DB2 to the portion of sub-intervals S5 and S6 corresponding to second intervals P62 and P64 in which a following combined image is displayed on the first and second display blocks DB1 and DB2. The eyeglasses part 700 opens the right-eye shutter 730 in response to the right-eye shutter signal RSS during an interval from the portion of sub-intervals S5 and S6 corresponding to the second intervals P62 and P64 in which the combined image is displayed on the first and second display blocks DB1 and DB2 to the portion of sub-intervals S9 and S10 corresponding to the second intervals P62 and P64 in which a following combined image is displayed on the first and second display blocks DB1 and DB2.

Accordingly, lights are provided to the display panel 200 in an interval in which the left-eye image L or the right-eye image R is displayed on the display panel 200, so that a crosstalk between the left-eye image L and the right-eye image R is not viewed by a viewer.

The black image is inserted between the left-eye image and the right-eye image, so that a time in which a current right-eye image is displayed may be substantially decreased with respect to a previous left-eye image. Thus, it may substantially increase a duty ratio of a light source driving signal which turns on the light source part 600A to substantially enhance a luminance efficiency of a display apparatus.

According to the present exemplary embodiments, the left-eye image (or the right-eye image) is repeatedly corrected in k times, so that a display quality of a stereoscopic image may be substantially enhanced. Moreover, lights are not provided to the display panel during an interval in which the left-eye image and the right-eye image are combined to be displayed on the display panel, so that a crosstalk of a stereoscopic image may be prevented. Moreover, the black image is inserted between the left-eye image and the right-eye image, so that a time for correcting a slow falling response speed of liquid crystal may be secured. Thus, a duty ratio of a light source driving signal is altered, so that luminance efficiency may be substantially enhanced.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A method for displaying a stereoscopic image, the method comprising:
    generating k images for a left eye and k images for a right eye based on a same left-eye single frame image and a same right-eye single frame image, respectively, where 'k' is a natural number greater than two;
    correcting the k images for the right eye using an n-th image of the k images for the left eye that are previously received;
    correcting the k images for the left eye using an n-th image of the k images for the right eye that are previously received, the k images for the left eye corrected using k look up tables, respectively and the k images for the right eye corrected using the k look up tables, respectively, where 'n' is a natural number greater than 'k';
    sequentially displaying corrected k images for the left eye in k times and corrected k images for the right eye in k times displaying one frame image respectively for each of the left eye and the right eye on a display panel in a progressive scan method; and
    providing the display panel with lights based on the image displayed on the display panel.

2. The method of claim 1, wherein correcting the image currently received comprises:
    storing an n-th image of at least one of the k images for the left eye image and the k images for the right-eye image that are previously received; and
    correcting at least one of the k images for the left-eye image and the k images for the right-eye image using the stored n-th image.

3. The method of claim 2, wherein a first image for the left-eye image and a first image for the right-eye image are corrected using a first look up table and a second image for the left-eye image and a second image for the right-eye image are corrected using a second look up table.

4. The method of claim 1, further comprising:
selectively opening and closing a left-eye shutter and a right-eye shutter of an eyeglasses part in accordance with the image displayed on the display panel.

5. The method of claim 1, wherein generating the k images comprises:
generating four left-eye images by repeatedly displaying the left-eye image four times; and
generating four right-eye images by repeatedly displaying the right-eye image four times.

6. The method of claim 5, wherein providing the lights to the display panel comprises:
providing the lights to a whole area of the display panel in a first interval in which one of the left-eye image and the right-eye image is displayed on the display panel; and
blocking the lights to the whole area of the display panel in a second interval in which the left-eye image and the right-eye image are displayed on the display panel.

7. The method of claim 5, wherein the display panel comprises a plurality of display blocks, and a light source part providing the display panel with the lights comprises a plurality of light-emitting blocks in correspondence with the plurality of display blocks,
wherein providing the lights to the display panel comprises:
providing lights to a whole area of the display panel in a first interval in which one of the left-eye image and the right-eye image is displayed on the display panel; and
blocking lights to the whole area of the display panel in a second interval in which the left-eye image and the right-eye image are displayed on the display panel.

8. The method of claim 5, wherein a light source part providing lights to the display panel comprises a first light-emitting module disposed at an upper side of the display panel and a second light-emitting module disposed at a lower side of the display panel,
wherein providing the lights to the display panel comprises:
providing the lights to a first display block by the first light-emitting module in a first interval in which one of the left-eye image and the right-eye image is displayed on the first display block of the display panel adjacent to the first light-emitting module;
blocking the lights to the first display block by the first light-emitting module in a second interval in which the left-eye image and the right-eye image are displayed on the first display block;
providing the lights to a second display block by the second light-emitting module in a third interval in which one of the left-eye image and the right-eye image is displayed on the second display block of the display panel adjacent to the second light-emitting module; and
blocking the lights to the second display block by the second light-emitting module in a fourth interval in which the left-eye image and the right-eye image are displayed on the second display block.

9. The method of claim 1, wherein generating the k images comprises:
generating (k−1) left-eye images in which the left-eye images are repeated (k−1) times and a black image; and
generating (k−1) right-eye images in which the right-eye images are repeated (k−1) times and a black image.

10. The method of claim 9, wherein providing the lights to the display panel comprises:
providing the lights to a whole area of the display panel in a first interval in which one of the left-eye image and the right-eye image is displayed on the display panel; and
blocking the lights to the whole area of the display panel in a second interval in which the left-eye image and the right-eye image are displayed on the display panel.

11. The method of claim 9, wherein the display panel comprises a plurality of display blocks, and a light source part providing the display panel with the lights comprises a plurality of light-emitting blocks in correspondence with the plurality of display blocks,
wherein providing the lights to the display panel comprises:
providing the lights to the display block in a first interval in which one of the left-eye image and the right-eye image is displayed on the display block; and
blocking the lights to the display block in a second interval in which the left-eye image and the right-eye image are displayed on the display block.

12. The method of claim 9, wherein a light source part providing lights to the display panel comprises a first light-emitting module disposed at an upper side of the display panel and a second light-emitting module disposed at a lower side of the display panel,
wherein providing the lights to the display panel comprises:
providing the lights to a first display block by the first light-emitting module in a first interval in which one of the left-eye image and the right-eye image is displayed on the first display block of the display panel adjacent to the first light-emitting module;
blocking the lights to the first display block by the first light-emitting module in a second interval in which the left-eye image and the right-eye image are displayed on the first display block;
providing the lights to a second display block by the second light-emitting module in a third interval in which one of the left-eye image and the right-eye image is displayed on the second display block of the display panel adjacent to the second light-emitting module; and
blocking the lights to the second display block by the second light-emitting module in a fourth interval in which the left-eye image and the right-eye image are displayed on the second display block.

13. A display apparatus comprising:
a frame control part configured to generate k images for a left eye frame image and k images for a right eye frame image based on a left-eye single frame image and a same right-eye single frame image, respectively, where 'k' is a natural number greater than two;
a data correcting part which corrects the k images for the right eye using an n-th image of the k images for the left eye that are previously received, and corrects the k images for the left eye using an n-th image of the k images for the right eye that are previously received, the k images for the left eye corrected using k look up tables, respectively and the k images for the right eye corrected using the k look up tables, respectively, where 'n' is a natural number greater than 'k';
a panel driving part which sequentially displays corrected k images for the left eye and corrected k images for the right eye in k times displaying one frame image respectively for each of the left eye and the right eye on a display panel in a progressive scan method; and a light source part which provides the display panel with lights based on an image displayed on the display panel.

14. The display apparatus of claim 13, wherein the data correcting part comprises:
   a frame detecting part which detects one of an n-th image of k images for the left eye and k images for the right eye that are previously received;
   a frame memory which stores the detected n-th image; and
   a correcting part which comprises the k look up tables, the correcting part configured to correct one of the k images for the left eye and the k images for the right eye using the stored n-th image,
   wherein a first image for the left-eye image and a first image for the right-eye image are corrected using a first look up table and a second image for the left-eye image and a second image for the right-eye image are corrected using a second look up table.

15. The display apparatus of claim 14, wherein the frame control part generates four left-eye images by repeatedly displaying the left-eye image four times, and generates four right-eye images by repeatedly displaying the right-eye image four times.

16. The display apparatus of claim 14, wherein the frame control part generates (k−1) left-eye images in which the left-eye images are repeated (k−1) times and a black image, and generates (k−1) right-eye images in which the right-eye images are repeated (k−1) times and a black image.

17. The display apparatus of claim 13, wherein the light source part provides the lights to a whole area of the display panel in a first interval in which one of the left-eye image and the right-eye image is displayed on the display panel, and blocks the lights to the whole area of the display panel in a second interval in which the left-eye image and the right-eye image are displayed on the display panel.

18. The display apparatus of claim 13, wherein the light source part comprises a plurality of light-emitting blocks disposed below the display panel to provide each display block of the display panel with the lights,
   wherein the light-emitting block provides the lights to the display block in a first interval in which one of the left-eye image and the right-eye image is displayed on display blocks respectively corresponding to each light-emitting block, and
   the light-emitting block blocks the lights to the display block in a second interval in which the left-eye image and the right-eye image are displayed on the display blocks.

19. The display apparatus of claim 13, wherein the light source part comprises a first light-emitting module disposed at an upper side of the display panel and a second light-emitting module disposed at a lower side of the display panel,
   the first light-emitting module provides the lights to a first display block in a first interval in which one of the left-eye image and the right-eye image is displayed on the first display block of the display panel adjacent to the first light-emitting module;
   the first light-emitting module blocks the lights to the first display block in a second interval in which the left-eye image and the right-eye image are displayed on the first display block;
   the second light-emitting module provides the lights to a second display block in a third interval in which one of the left-eye image and the right-eye image is displayed on the second display block of the display panel adjacent to the second light-emitting module; and
   the second light-emitting module blocks the lights to the second display block in a fourth interval in which the left-eye image and the right-eye image are displayed on the second display block.

20. The display apparatus of claim 13, wherein the light source part comprises a first light-emitting module disposed at a left side of the display panel to comprise a plurality of first light-emitting blocks and a second light-emitting module disposed at a right side of the display panel to comprise a plurality of second light-emitting blocks,
   wherein the first and second light-emitting blocks provide the lights to a display block in a first interval in which one of the left-eye image and the right-eye image is displayed on the display block of the display panel corresponding to the first and second light-emitting blocks, and
   the first and second light-emitting blocks block the lights to the display block in a second interval in which the left-eye image and the right-eye image are displayed on the display block.

* * * * *